US012409544B2

(12) United States Patent
Brunner et al.

(10) Patent No.: US 12,409,544 B2
(45) Date of Patent: Sep. 9, 2025

(54) SAWHORSE

(71) Applicants: KETER HOME AND GARDEN PRODUCTS LTD, Herzliya (IL); MILWAUKEE ELECTRIC TOOL CORPORATION, Brookfield, WI (US)

(72) Inventors: Yaron Brunner, Gvat (IL); Izhar Shani, I, Gvat (IL); Uri Parizer, Hukok (IL)

(73) Assignee: KETER HOME AND GARDEN PRODUCTS LTD, Herzliya (IL)

( * ) Notice: Subject to any disclaimer, the term of this patent is extended or adjusted under 35 U.S.C. 154(b) by 346 days.

(21) Appl. No.: 17/761,581

(22) PCT Filed: Sep. 16, 2020

(86) PCT No.: PCT/IL2020/051019
§ 371 (c)(1),
(2) Date: Mar. 17, 2022

(87) PCT Pub. No.: WO2021/059264
PCT Pub. Date: Apr. 1, 2021

(65) Prior Publication Data
US 2022/0402113 A1 Dec. 22, 2022

(30) Foreign Application Priority Data
Sep. 23, 2019 (IL) .......................................... 269564

(51) Int. Cl.
*B25H 1/06* (2006.01)

(52) U.S. Cl.
CPC ...................................... *B25H 1/06* (2013.01)

(58) Field of Classification Search
CPC .......... B25H 1/06; B25H 1/0078; B25H 1/04; B25H 1/08; B25H 3/02–022; B65D 21/00; B65D 21/0209; B65D 21/0202; B25B 11/00; B27B 5/06; B27B 17/0041; B23Q 9/0042; B23Q 9/0014
USPC .................................. 269/289, 136–138, 16
See application file for complete search history.

(56) References Cited

U.S. PATENT DOCUMENTS

| | | | |
|---|---|---|---|
| 368,397 | A | 8/1887 | Hild |
| 495,537 | A | 4/1893 | Westerman |
| 509,839 | A | 11/1893 | Bowley |
| 819,331 | A | 5/1906 | Aucutt |

(Continued)

FOREIGN PATENT DOCUMENTS

| | | | |
|---|---|---|---|
| CA | 2562993 | A1 | 4/2007 |
| CN | 2608238 | Y | 3/2004 |

(Continued)

OTHER PUBLICATIONS

Miwaukee Packout Tool Box (online), dated Mar. 31, 2023. Retrieved from Internet Oct. 17, 2024, URL: https://www.amazon.com/48-22-8424-Milwaukee-Packout-Waterproof-Capacity/dp/BOC14RMSG6/ref (4 pages) (Year: 2023).

(Continued)

*Primary Examiner* — Brian D Keller
*Assistant Examiner* — Jason Khalil Hawkins
(74) *Attorney, Agent, or Firm* — Cantor Colburn LLP

(57) ABSTRACT

The present disclosure concerns a sawhorse. More particularly the disclosure concerns a sawhorse configured with an articulation system.

21 Claims, 19 Drawing Sheets

(56) References Cited

U.S. PATENT DOCUMENTS

| | | | |
|---|---|---|---|
| 879,325 | A | 2/1908 | Rued |
| 920,744 | A | 5/1909 | Hiscook |
| 1,081,378 | A | 12/1913 | Freeman |
| 1,084,360 | A | 1/1914 | Rahm |
| 1,112,943 | A | 10/1914 | Stone |
| 1,167,029 | A | 1/1916 | Stickle |
| 1,488,460 | A | 3/1924 | Scheer |
| 1,704,480 | A | 3/1929 | Kicileski |
| 2,042,387 | A | 5/1936 | Cobb |
| 2,100,036 | A | 11/1937 | Michal |
| 2,103,106 | A | 12/1937 | Yurkovitch |
| 2,124,541 | A | 7/1938 | Cassey |
| 2,210,235 | A | 8/1940 | Filbert |
| 2,372,845 | A | 4/1945 | Nelson |
| 2,386,343 | A | 10/1945 | Regenhardt |
| 2,430,200 | A | 11/1947 | Wilson |
| 2,472,363 | A | 6/1949 | Blackinton |
| 2,558,126 | A | 6/1951 | Davenport |
| 2,588,009 | A | 3/1952 | Jones |
| 2,733,076 | A | 1/1956 | Burnett |
| 2,939,613 | A | 6/1960 | Herman |
| 2,970,358 | A | 2/1961 | Elsner |
| 3,005,282 | A | 10/1961 | Christiansen |
| 3,117,692 | A | 1/1964 | Carpenter |
| 3,162,819 | A | 12/1964 | Ober |
| 3,186,585 | A | 6/1965 | Denny |
| 3,201,035 | A | 8/1965 | Martin |
| 3,225,865 | A | 12/1965 | Downey |
| 3,338,452 | A | 8/1967 | Oakley et al. |
| 3,370,236 | A | 2/1968 | Walker |
| 3,402,954 | A | 9/1968 | Simon |
| 3,424,334 | A | 1/1969 | Goltz |
| 3,426,786 | A | 2/1969 | Canalizo |
| 3,506,321 | A | 4/1970 | Hampel |
| 3,514,170 | A | 5/1970 | Shewchuk |
| 3,550,908 | A | 12/1970 | Propost |
| 3,552,817 | A | 1/1971 | Marcolongo |
| 3,567,298 | A | 3/1971 | Ambaum |
| 3,685,866 | A | 8/1972 | Patenaude |
| 3,743,372 | A | 7/1973 | Ruggerone |
| 3,778,175 | A | 12/1973 | Zimmer |
| D232,798 | S | 9/1974 | Roche |
| 3,835,623 | A | 9/1974 | Kline |
| 3,851,936 | A | 12/1974 | Muller |
| 3,913,741 | A | 10/1975 | Pirie |
| 3,935,613 | A | 2/1976 | Kaneko |
| 3,974,898 | A | 8/1976 | Tullis |
| 3,999,818 | A | 12/1976 | Schankler |
| 4,043,566 | A | 8/1977 | Johnson |
| 4,122,925 | A | 10/1978 | Schultheiss |
| 4,126,366 | A | 11/1978 | Handler et al. |
| 4,168,076 | A | 9/1979 | Johnson |
| 4,243,279 | A | 1/1981 | Ackeret |
| 4,303,367 | A | 12/1981 | Bott |
| 4,323,786 | A | 4/1982 | Snow |
| 4,338,987 | A | 7/1982 | Miles |
| 4,367,615 | A | 1/1983 | Feldman |
| 4,389,133 | A | 6/1983 | Oberst |
| 4,457,436 | A | 7/1984 | Kelley |
| 4,467,925 | A | 8/1984 | Ratzloff et al. |
| 4,491,231 | A | 1/1985 | Heggeland |
| 4,524,985 | A | 6/1985 | Drake |
| 4,531,645 | A | 7/1985 | Tisbo et al. |
| 4,535,897 | A | 8/1985 | Remington et al. |
| 4,564,732 | A | 1/1986 | Lancaster |
| 4,577,772 | A | 3/1986 | Bigliardi |
| D285,986 | S | 10/1986 | Huang |
| 4,639,005 | A | 1/1987 | Birkley |
| 4,643,494 | A | 2/1987 | Marleau |
| 4,660,725 | A | 4/1987 | Fishman |
| 4,673,070 | A | 6/1987 | Ambal |
| 4,684,034 | A | 8/1987 | Ono |
| 4,686,034 | A | 8/1987 | Ono |
| 4,693,345 | A | 9/1987 | Mittelmann |
| 4,735,107 | A | 4/1988 | Winkie |
| 4,775,282 | A | 10/1988 | Van Vliet |
| 4,805,859 | A | 2/1989 | Hudson |
| 4,817,237 | A | 4/1989 | Murphy |
| 4,880,248 | A | 11/1989 | Elmer |
| 4,929,973 | A | 5/1990 | Nakatani |
| 4,971,201 | A | 11/1990 | Sathre |
| 5,035,389 | A | 7/1991 | Wang |
| 5,035,445 | A | 7/1991 | Poulin |
| D319,016 | S | 8/1991 | Kahl |
| 5,098,235 | A | 3/1992 | Svetlik |
| D325,324 | S | 4/1992 | Kahl |
| 5,105,947 | A | 4/1992 | Wise |
| D326,815 | S | 6/1992 | Meisner |
| 5,154,291 | A | 10/1992 | Sur |
| 5,219,446 | A | 6/1993 | Klepac |
| 5,240,264 | A | 8/1993 | Williams |
| 5,244,300 | A | 9/1993 | Perreira |
| D340,167 | S | 10/1993 | Kahl |
| 5,263,576 | A | 11/1993 | Boreen et al. |
| 5,282,554 | A | 2/1994 | Thomas |
| 5,301,829 | A | 4/1994 | Chrisco |
| 5,325,966 | A | 7/1994 | Chang |
| 5,356,038 | A | 10/1994 | Banks |
| 5,356,105 | A | 10/1994 | Andrews |
| D352,208 | S | 11/1994 | Brookeshire |
| 5,375,709 | A | 12/1994 | Petro |
| 5,386,959 | A | 2/1995 | Laughlin et al. |
| 5,407,170 | A | 4/1995 | Slivon et al. |
| 5,429,235 | A | 7/1995 | Chen |
| 5,429,260 | A | 7/1995 | Vollers |
| 5,433,416 | A | 7/1995 | Johnson |
| D361,511 | S | 8/1995 | Dickinson |
| 5,437,502 | A | 8/1995 | Warnick et al. |
| 5,454,634 | A | 10/1995 | Herbst |
| 5,538,213 | A | 7/1996 | Brown |
| 5,595,228 | A | 1/1997 | Meisner |
| 5,608,603 | A | 3/1997 | Su |
| 5,622,296 | A | 4/1997 | Pirhonen |
| 5,628,443 | A | 5/1997 | Deutsch |
| 5,653,366 | A | 8/1997 | Liserre |
| 5,664,292 | A | 9/1997 | Chen |
| 5,676,292 | A | 10/1997 | Miller |
| D395,533 | S | 6/1998 | Morison |
| 5,775,046 | A | 7/1998 | Fanger |
| 5,797,617 | A | 8/1998 | Lin |
| 5,850,996 | A | 12/1998 | Liang |
| 5,890,613 | A | 4/1999 | Williams |
| 5,906,381 | A | 5/1999 | Hovatter |
| 5,951,037 | A | 9/1999 | Hsieh |
| 5,957,421 | A | 9/1999 | Barbour |
| D415,393 | S | 10/1999 | Kei |
| 5,988,473 | A | 11/1999 | Hagan |
| 5,996,869 | A | 12/1999 | Belinky |
| 6,006,973 | A | 12/1999 | Belinky |
| D420,860 | S | 2/2000 | Golichowski |
| 6,036,071 | A | 3/2000 | Hartmann |
| 6,050,660 | A | 4/2000 | Gurley |
| 6,059,135 | A | 5/2000 | James et al. |
| 6,059,381 | A | 5/2000 | Bayer |
| 6,082,539 | A | 7/2000 | Lee |
| 6,082,687 | A | 7/2000 | Kump |
| 6,085,925 | A | 7/2000 | Chung |
| 6,098,858 | A | 8/2000 | Laugesen |
| 6,099,035 | A | 8/2000 | Garvin |
| 6,109,627 | A | 8/2000 | Be |
| 6,123,344 | A | 9/2000 | Clegg |
| 6,131,926 | A | 10/2000 | Harlan |
| 6,161,983 | A | 12/2000 | Berger |
| 6,176,558 | B1 | 1/2001 | Hlade |
| 6,176,559 | B1 | 1/2001 | Tiramani |
| D437,484 | S | 2/2001 | Tiramani |
| D437,669 | S | 2/2001 | Blason |
| 6,202,909 | B1 | 3/2001 | Belinky |
| 6,253,981 | B1 | 7/2001 | McLemore |
| 6,286,824 | B1 | 9/2001 | Sagol |
| 6,298,946 | B1 * | 10/2001 | Yemini .................. B27B 21/00 182/183.1 |
| 6,305,498 | B1 | 10/2001 | Itzkovitch |
| 6,311,881 | B1 | 11/2001 | Kamiya |

(56) References Cited

U.S. PATENT DOCUMENTS

| | | | | |
|---|---|---|---|---|
| 6,347,847 | B1 | 2/2002 | Tiramani | |
| 6,354,759 | B1 | 3/2002 | Leicht | |
| 6,367,631 | B1 | 4/2002 | Steigerwald | |
| 6,371,320 | B2 | 4/2002 | Sagol | |
| 6,371,321 | B1 | 4/2002 | Lee | |
| 6,371,424 | B1 | 4/2002 | Shaw | |
| D456,972 | S | 5/2002 | Blason | |
| 6,382,486 | B1 | 5/2002 | Kretchman | |
| 6,390,343 | B1 | 5/2002 | Jain | |
| 6,431,580 | B1 | 8/2002 | Kady | |
| 6,435,357 | B1 | 8/2002 | Lee | |
| 6,497,395 | B1 | 12/2002 | Croker | |
| 6,547,347 | B2 | 4/2003 | Saito | |
| 6,601,930 | B2 | 8/2003 | Tiramani | |
| 6,619,772 | B2 | 9/2003 | Dierbeck | |
| 6,637,707 | B1 | 10/2003 | Gates | |
| 6,641,013 | B2 | 11/2003 | Dise | |
| 6,666,362 | B1 | 12/2003 | LeTrudent | |
| 6,712,180 | B2 * | 3/2004 | Levy | B25H 1/06 182/225 |
| 6,729,827 | B1 | 5/2004 | Williams | |
| 6,889,838 | B2 | 5/2005 | Meier | |
| 6,889,938 | B1 | 5/2005 | Meier | |
| 6,945,546 | B2 | 9/2005 | Guirlinger | |
| 6,948,691 | B2 | 9/2005 | Brock | |
| 6,983,946 | B2 | 1/2006 | Sullivan | |
| 6,984,691 | B2 | 1/2006 | Nagahama | |
| 7,007,903 | B2 | 3/2006 | Turner | |
| 7,044,484 | B2 | 5/2006 | Wang | |
| 7,066,475 | B2 | 6/2006 | Barnes | |
| 7,077,372 | B2 | 7/2006 | Moran | |
| D525,789 | S | 8/2006 | Hosking | |
| D527,225 | S | 8/2006 | Krieger | |
| 7,083,061 | B2 | 8/2006 | Spindel | |
| 7,090,085 | B1 | 8/2006 | Vicendese | |
| 7,121,417 | B2 | 10/2006 | Magnusson | |
| 7,147,243 | B2 | 12/2006 | Kady | |
| 7,152,752 | B2 | 12/2006 | Kurtenbach | |
| D536,580 | S | 2/2007 | Krieger | |
| 7,172,164 | B2 | 2/2007 | Fuelling | |
| 7,219,969 | B2 | 5/2007 | Bezzubov | |
| D545,697 | S | 7/2007 | Martin | |
| 7,263,742 | B2 | 9/2007 | Valentini | |
| 7,350,648 | B2 | 4/2008 | Gerstner | |
| 7,367,571 | B1 | 5/2008 | Nichols | |
| 7,416,193 | B1 | 8/2008 | Barnett | |
| 7,431,172 | B1 | 10/2008 | Spindel | |
| 7,431,313 | B1 | 10/2008 | Torres et al. | |
| 7,448,115 | B2 | 11/2008 | Howell | |
| 7,490,800 | B2 | 2/2009 | Tu | |
| 7,503,569 | B2 | 3/2009 | Duvigneau | |
| 7,658,887 | B2 | 2/2010 | Hovatter | |
| 7,690,856 | B2 | 4/2010 | Mortensen | |
| 7,757,913 | B2 | 7/2010 | Fichera | |
| 7,779,764 | B2 | 8/2010 | Naidu | |
| 7,780,026 | B1 | 8/2010 | Zuckerman | |
| D627,967 | S | 11/2010 | Kuhls | |
| 7,837,165 | B2 | 11/2010 | Stone | |
| 7,841,144 | B2 | 11/2010 | Pervan | |
| 7,845,501 | B1 | 12/2010 | Fosburg et al. | |
| D630,851 | S | 1/2011 | Landau | |
| D632,043 | S | 2/2011 | Rouillard | |
| 8,028,845 | B2 | 10/2011 | Himes | |
| D649,350 | S | 11/2011 | Shitrit | |
| D649,783 | S | 12/2011 | Brunner | |
| D653,832 | S | 2/2012 | Vilkomirski | |
| 8,132,819 | B2 | 3/2012 | Landau | |
| 8,177,463 | B2 | 5/2012 | Walker | |
| D661,858 | S | 6/2012 | Lifshitz | |
| 8,191,910 | B2 | 6/2012 | Landau | |
| D663,952 | S | 7/2012 | Crevling | |
| D664,354 | S | 7/2012 | Crevling | |
| D668,869 | S | 10/2012 | Yamamoto | |
| 8,292,244 | B2 | 10/2012 | Okada | |
| D674,605 | S | 1/2013 | Vilkomirski | |
| 8,448,829 | B2 | 5/2013 | Watanabe | |
| 8,453,796 | B2 | 6/2013 | Astor et al. | |
| 8,454,033 | B2 | 6/2013 | Tsai | |
| 8,459,495 | B2 | 6/2013 | Koenig | |
| 8,505,729 | B2 | 8/2013 | Sosnovsky | |
| 8,567,796 | B2 | 10/2013 | Bar-Erez | |
| 8,590,704 | B2 | 11/2013 | Koenig | |
| 8,602,217 | B2 | 12/2013 | Sosnovsky | |
| 8,640,913 | B2 | 2/2014 | Berendes | |
| 8,657,307 | B2 | 2/2014 | Lifshitz | |
| 8,677,661 | B2 | 3/2014 | Michels | |
| D701,696 | S | 4/2014 | Shitrit | |
| D703,436 | S | 4/2014 | Sabbag | |
| 8,689,396 | B2 | 4/2014 | Wolfe | |
| 8,714,355 | B2 | 5/2014 | Huang | |
| 8,740,010 | B1 | 6/2014 | Page | |
| D711,105 | S | 8/2014 | Brunner | |
| 8,813,960 | B2 | 8/2014 | Fjelland | |
| 8,851,282 | B2 | 10/2014 | Brunner | |
| 8,875,888 | B2 | 11/2014 | Koenig | |
| 8,894,160 | B1 | 11/2014 | Christensen | |
| 8,924,752 | B1 | 12/2014 | Law | |
| 8,925,752 | B2 | 1/2015 | Smith | |
| 8,967,379 | B2 | 3/2015 | Kinskey et al. | |
| 8,974,139 | B2 | 3/2015 | Saul | |
| 8,979,100 | B2 | 3/2015 | Bensman | |
| 8,985,418 | B1 | 3/2015 | Poudrier | |
| 8,985,922 | B2 | 3/2015 | Neumann | |
| 9,089,964 | B2 | 7/2015 | Cheng | |
| D738,105 | S | 9/2015 | Shitrit | |
| D738,106 | S | 9/2015 | Shitrit | |
| D738,622 | S | 9/2015 | Sabbag | |
| 9,126,329 | B2 | 9/2015 | Kao | |
| 9,132,543 | B2 | 9/2015 | Bar-Erez | |
| 9,216,751 | B2 | 12/2015 | Adams et al. | |
| 9,254,856 | B2 | 2/2016 | Oachs | |
| D753,394 | S | 4/2016 | Brunner | |
| D753,395 | S | 4/2016 | Brunner | |
| D753,396 | S | 4/2016 | Brunner | |
| D753,982 | S | 4/2016 | Guirlinger | |
| 9,375,835 | B1 | 6/2016 | Lin | |
| D765,974 | S | 9/2016 | Tonelli | |
| 9,447,804 | B2 | 9/2016 | Andersson | |
| D770,179 | S | 11/2016 | Menirom | |
| 9,506,489 | B2 | 11/2016 | Ko | |
| 9,511,491 | B2 | 12/2016 | Brunner | |
| D777,426 | S | 1/2017 | Dahl | |
| 9,551,367 | B1 | 1/2017 | Shieh | |
| 9,566,990 | B2 | 2/2017 | Bar-Erez | |
| D784,089 | S | 4/2017 | Furneaux | |
| 9,616,562 | B2 | 4/2017 | Hoppe | |
| 9,643,629 | B2 | 5/2017 | Bar-Erez | |
| D790,221 | S | 6/2017 | Yahav | |
| 9,694,758 | B1 | 7/2017 | Krolski | |
| 9,701,443 | B2 | 7/2017 | Wang | |
| 9,725,209 | B1 | 8/2017 | Ben-Gigi | |
| 9,776,651 | B2 | 10/2017 | Huang | |
| 9,791,443 | B2 | 10/2017 | Weinschenk | |
| D803,631 | S | 11/2017 | Min | |
| 9,844,870 | B2 | 12/2017 | Reinhart | |
| 9,850,029 | B2 | 12/2017 | Brunner | |
| D806,483 | S | 1/2018 | Stanford | |
| 9,872,562 | B2 | 1/2018 | Brunner | |
| D810,432 | S | 2/2018 | Ballou | |
| 9,888,752 | B2 | 2/2018 | Boer | |
| D814,187 | S | 4/2018 | Caglar | |
| D815,434 | S | 4/2018 | Brown et al. | |
| D815,831 | S | 4/2018 | Tonelli | |
| D816,334 | S | 5/2018 | Brunner | |
| 10,017,134 | B2 | 7/2018 | Pickens | |
| D826,510 | S | 8/2018 | Brunner | |
| RE47,022 | E | 9/2018 | Sosnovsky | |
| D828,671 | S | 9/2018 | Cope | |
| D831,352 | S | 10/2018 | Brunner | |
| 10,106,180 | B2 | 10/2018 | Bar-Erez | |
| D833,744 | S | 11/2018 | Yahav | |
| 10,138,917 | B2 | 11/2018 | Koch | |
| D836,995 | S | 1/2019 | Carey | |
| D837,515 | S | 1/2019 | Shpitzer | |

(56) References Cited

U.S. PATENT DOCUMENTS

| | | | |
|---|---|---|---|
| D839,681 | S | 2/2019 | Evron |
| 10,222,172 | B2 | 3/2019 | Melville |
| D845,080 | S | 4/2019 | Jacobson |
| D845,081 | S | 4/2019 | Jacobson |
| 10,246,116 | B2 | 4/2019 | Oltman et al. |
| 10,286,542 | B2 | 5/2019 | Wolle |
| 10,336,359 | B1 | 7/2019 | Asbille |
| D857,387 | S | 8/2019 | Shpitzer |
| 10,406,387 | B2 | 9/2019 | Krepel |
| 10,406,673 | B2 | 9/2019 | Shechtman |
| 10,434,638 | B1 | 10/2019 | Tsai |
| 10,434,639 | B1 | 10/2019 | Chen et al. |
| 10,479,284 | B1 | 11/2019 | Salyer |
| D871,013 | S | 12/2019 | Liu |
| D873,004 | S | 1/2020 | Shpitzer |
| D873,085 | S | 1/2020 | DeFrancia |
| D876,833 | S | 3/2020 | Brunner |
| 10,583,962 | B2 | 3/2020 | Brunner |
| 10,593,962 | B2 | 3/2020 | Herchen |
| 10,603,783 | B2 | 3/2020 | Brocket |
| D880,252 | S | 4/2020 | Jacobson |
| D880,951 | S | 4/2020 | Jacobson |
| D883,752 | S | 5/2020 | Carey |
| D887,788 | S | 6/2020 | Meda |
| D888,422 | S | 6/2020 | Yang |
| D888,503 | S | 6/2020 | Meda |
| D891,193 | S | 7/2020 | Stanford |
| D891,195 | S | 7/2020 | Zhou |
| 10,703,534 | B2 | 7/2020 | Brunner |
| D891,875 | S | 8/2020 | Olson |
| D892,565 | S | 8/2020 | Astle |
| D893,183 | S | 8/2020 | Eisenhardt et al. |
| 10,750,833 | B2 | 8/2020 | Burchia |
| D895,375 | S | 9/2020 | Hurley |
| D895,966 | S | 9/2020 | Brunner |
| D895,967 | S | 9/2020 | Brunner |
| D896,517 | S | 9/2020 | Brunner |
| D896,518 | S | 9/2020 | Brunner |
| D897,103 | S | 9/2020 | Brunner |
| 10,758,065 | B2 | 9/2020 | Penalver |
| D898,320 | S | 10/2020 | Brunner |
| 10,793,172 | B2 | 10/2020 | Brunner |
| 10,829,268 | B2 | 11/2020 | Sommer |
| 10,829,269 | B2 | 11/2020 | Gonitianer |
| D903,430 | S | 12/2020 | Eisenhardt et al. |
| 10,894,314 | B2 | 1/2021 | Hocine |
| 10,933,501 | B2 | 3/2021 | Bisson |
| 10,962,218 | B2 | 3/2021 | Plato |
| D915,069 | S | 4/2021 | Tonelli |
| 10,981,696 | B2 | 4/2021 | Brunner |
| D917,977 | S | 5/2021 | Brunner |
| D918,584 | S | 5/2021 | Brunner |
| D919,296 | S | 5/2021 | Brunner |
| 11,008,136 | B2 | 5/2021 | Brunner |
| D920,671 | S | 6/2021 | Brunner |
| 11,027,883 | B1 | 6/2021 | Brunner |
| D923,935 | S | 7/2021 | Brunner |
| 11,059,631 | B1 | 7/2021 | Brunner |
| 11,066,089 | B2 | 7/2021 | Brunner |
| 11,124,347 | B2 | 9/2021 | Chen |
| D932,186 | S | 10/2021 | Brunner |
| 11,155,382 | B1 | 10/2021 | Cai |
| D936,030 | S | 11/2021 | Lee |
| 11,192,690 | B1 | 12/2021 | Brunner |
| D941,020 | S | 1/2022 | Brunner |
| 11,230,410 | B2 | 1/2022 | Brunner |
| 11,253,037 | B2 | 2/2022 | Bomer |
| 11,267,119 | B2 | 3/2022 | Hoppe |
| 11,283,117 | B2 | 3/2022 | Polakowski |
| 11,338,959 | B2 | 5/2022 | Hoppe |
| 11,365,026 | B2 | 6/2022 | Bunner |
| 11,385,055 | B2 | 7/2022 | Millane |
| 11,426,859 | B2 | 8/2022 | Squiers |
| D965,294 | S | 10/2022 | Adin |
| D967,693 | S | 10/2022 | Brunner |
| 11,464,335 | B2 | 10/2022 | Brunner |
| 11,486,547 | B1 | 11/2022 | Charles |
| 11,510,486 | B2 | 11/2022 | Adams |
| 11,529,985 | B2 | 12/2022 | Brunner |
| 11,530,716 | B2 | 12/2022 | Bastian |
| 11,554,898 | B2 | 1/2023 | Brunner |
| 11,612,998 | B1 | 3/2023 | Byington |
| 11,638,992 | B2 | 5/2023 | Jessop |
| 11,667,029 | B1 | 6/2023 | Hsieh |
| 11,673,510 | B1 | 6/2023 | Nguyen |
| D998,865 | S | 9/2023 | Tonelli |
| D1,001,499 | S | 10/2023 | Brunner |
| 11,840,269 | B2 | 12/2023 | Brunner |
| D1,014,082 | S | 2/2024 | Tonelli |
| D1,014,967 | S | 2/2024 | Lam |
| D1,014,968 | S | 2/2024 | Lam |
| D1,015,745 | S | 2/2024 | Lam |
| D1,015,746 | S | 2/2024 | Lam |
| D1,018,045 | S | 3/2024 | Hattori |
| 11,936,197 | B2 | 3/2024 | Cholst |
| 11,952,167 | B2 | 4/2024 | Brunner |
| 11,964,632 | B2 | 4/2024 | Rutman |
| D1,036,117 | S | 7/2024 | Omry |
| 12,024,335 | B2 | 7/2024 | Zheng |
| 12,043,216 | B1 | 7/2024 | Nickel |
| 12,064,863 | B1 | 8/2024 | Tsai |
| 12,077,202 | B2 | 9/2024 | Williams |
| 12,179,956 | B2 | 12/2024 | Camp et al. |
| 12,187,491 | B2 | 1/2025 | Squiers |
| 12,195,229 | B2 | 1/2025 | Hoppe |
| 12,233,530 | B2 | 2/2025 | Blumenthal |
| 12,286,267 | B2 | 4/2025 | Hoppe |
| 2002/0000440 | A1 | 1/2002 | Sagol |
| 2002/0020729 | A1 | 2/2002 | Alter |
| 2002/0030425 | A1 | 3/2002 | Tiramani |
| 2002/0105129 | A1 | 8/2002 | Levy |
| 2002/0122691 | A1 | 9/2002 | Wood |
| 2002/0125072 | A1* | 9/2002 | Levy ........................ B25H 1/06 182/153 |
| 2002/0171228 | A1 | 11/2002 | Kady |
| 2003/0075468 | A1 | 4/2003 | Story |
| 2003/0080263 | A1 | 5/2003 | McCoy |
| 2003/0094392 | A1 | 5/2003 | Meier |
| 2003/0094393 | A1 | 5/2003 | Sahm |
| 2003/0115415 | A1 | 6/2003 | Valentini |
| 2003/0115715 | A1 | 6/2003 | Valentini |
| 2003/0139080 | A1 | 7/2003 | Lafragette |
| 2003/0146589 | A1 | 8/2003 | Jarko |
| 2003/0168952 | A1 | 9/2003 | Huang |
| 2003/0178919 | A1 | 9/2003 | Grudzien |
| 2003/0184034 | A1 | 10/2003 | Pfeiffer |
| 2003/0205877 | A1 | 11/2003 | Verna |
| 2004/0051290 | A1 | 3/2004 | Morgan |
| 2004/0074725 | A1 | 4/2004 | Shih |
| 2004/0103494 | A1 | 6/2004 | Valentini |
| 2004/0134818 | A1 | 7/2004 | Cunningham et al. |
| 2004/0149754 | A1 | 8/2004 | Diamant |
| 2004/0195793 | A1 | 10/2004 | Sullivan |
| 2004/0206656 | A1 | 10/2004 | Dubois |
| 2004/0256529 | A1 | 12/2004 | Richter |
| 2005/0015928 | A1 | 1/2005 | Arsenault |
| 2005/0035167 | A1 | 2/2005 | Threet |
| 2005/0062244 | A1 | 3/2005 | Guirlinger |
| 2005/0082775 | A1 | 4/2005 | Slager |
| 2005/0104308 | A1 | 5/2005 | Barnes |
| 2005/0139745 | A1 | 6/2005 | Liao |
| 2005/0242141 | A1 | 11/2005 | Zhang |
| 2005/0242144 | A1 | 11/2005 | Panosian |
| 2005/0247653 | A1 | 11/2005 | Brooks |
| 2005/0274759 | A1 | 12/2005 | Kircher |
| 2005/0280228 | A1 | 12/2005 | Fernandes et al. |
| 2006/0006770 | A1 | 1/2006 | Valentini |
| 2006/0027475 | A1 | 2/2006 | Gleason |
| 2006/0038367 | A9 | 2/2006 | Ferraro |
| 2006/0076261 | A1 | 4/2006 | Kurtenbach |
| 2006/0113303 | A1 | 6/2006 | Huruta |
| 2006/0119060 | A1 | 6/2006 | Sullivan |
| 2006/0120797 | A1 | 6/2006 | Mortensen |
| 2006/0151556 | A1 | 7/2006 | Eby |

(56) References Cited

U.S. PATENT DOCUMENTS

| | | | |
|---|---|---|---|
| 2006/0165482 | A1 | 7/2006 | Olberding |
| 2006/0186624 | A1 | 8/2006 | Kady |
| 2006/0254946 | A1 | 11/2006 | Becklin |
| 2007/0006542 | A1 | 1/2007 | Duke |
| 2007/0012694 | A1 | 1/2007 | Duvigneau |
| 2007/0045505 | A1 | 3/2007 | Chen |
| 2007/0068757 | A1 | 3/2007 | Tan |
| 2007/0090616 | A1 | 4/2007 | Tompkins |
| 2007/0138041 | A1 | 6/2007 | Welsh |
| 2007/0145700 | A1 | 6/2007 | Ambrose |
| 2007/0175938 | A1 | 8/2007 | Swenson |
| 2007/0194543 | A1 | 8/2007 | Duvigneau |
| 2007/0200309 | A1 | 8/2007 | Coppedge |
| 2007/0256996 | A1 | 11/2007 | Jackle |
| 2007/0273114 | A1 | 11/2007 | Katz |
| 2008/0011698 | A1 | 1/2008 | Simon |
| 2008/0060953 | A1 | 3/2008 | Ghassan |
| 2008/0104921 | A1 | 5/2008 | Pervan |
| 2008/0104931 | A1 | 5/2008 | Hatchell et al. |
| 2008/0115312 | A1 | 5/2008 | DiPasquale |
| 2008/0121547 | A1 | 5/2008 | Dur |
| 2008/0134607 | A1 | 6/2008 | Pervan |
| 2008/0136133 | A1 | 6/2008 | Takahashi |
| 2008/0169667 | A1 | 7/2008 | Siniarski |
| 2008/0169739 | A1 | 7/2008 | Goldenberg |
| 2008/0271280 | A1 | 11/2008 | Tiede |
| 2008/0277221 | A1 | 11/2008 | Josefson |
| 2008/0280523 | A1 | 11/2008 | Bishop |
| 2008/0296443 | A1 | 12/2008 | Lunitz |
| 2008/0308369 | A1 | 12/2008 | Louis |
| 2009/0026901 | A1 | 1/2009 | Nies |
| 2009/0044827 | A1 | 2/2009 | Zilber |
| 2009/0056592 | A1 | 3/2009 | Threet |
| 2009/0071990 | A1 | 3/2009 | Jardine |
| 2009/0120947 | A1 | 5/2009 | Davis et al. |
| 2009/0127146 | A1 | 5/2009 | Krebs |
| 2009/0140024 | A1 | 6/2009 | McLemore |
| 2009/0145790 | A1 | 6/2009 | Panosian |
| 2009/0145866 | A1 | 6/2009 | Panosian |
| 2009/0145913 | A1 | 6/2009 | Panosian |
| 2009/0178946 | A1 | 7/2009 | Patstone |
| 2009/0180853 | A1 | 7/2009 | Gang |
| 2009/0236482 | A1 | 9/2009 | Winig |
| 2009/0288970 | A1 | 11/2009 | Katz |
| 2010/0052276 | A1 | 3/2010 | Brunner |
| 2010/0066069 | A1 | 3/2010 | Bradshaw |
| 2010/0133213 | A1 | 6/2010 | Kao |
| 2010/0139566 | A1 | 6/2010 | Lopuszanski |
| 2010/0147642 | A1 | 6/2010 | Andochick |
| 2010/0176261 | A1 | 7/2010 | Chen |
| 2010/0219193 | A1 | 9/2010 | Becklin |
| 2010/0224528 | A1 | 9/2010 | Madsen |
| 2010/0254757 | A1 | 10/2010 | Saul |
| 2010/0290877 | A1 | 11/2010 | Landau |
| 2011/0049824 | A1 | 3/2011 | Bar-Erez |
| 2011/0068562 | A1 | 3/2011 | Keffeler et al. |
| 2011/0073516 | A1 | 3/2011 | Zelinskiy |
| 2011/0127736 | A1 | 6/2011 | Oliver |
| 2011/0139665 | A1 | 6/2011 | Madsen |
| 2011/0139777 | A1 | 6/2011 | Sosnosky |
| 2011/0155613 | A1 | 6/2011 | Koenig |
| 2011/0174939 | A1 | 7/2011 | Taylor |
| 2011/0181008 | A1 | 7/2011 | Bensman |
| 2011/0187248 | A1 | 8/2011 | Kao |
| 2011/0192810 | A1 | 8/2011 | Kao |
| 2011/0220531 | A1 | 9/2011 | Meether |
| 2011/0233160 | A1 | 9/2011 | Chen |
| 2011/0260588 | A1 | 10/2011 | Lin |
| 2011/0278336 | A1 | 11/2011 | Landrum |
| 2012/0036724 | A1 | 2/2012 | Walters |
| 2012/0061930 | A1 | 3/2012 | Lin |
| 2012/0073995 | A1 | 3/2012 | Parker |
| 2012/0074022 | A1 | 3/2012 | McTavish |
| 2012/0074158 | A1 | 3/2012 | Lafleur |
| 2012/0080432 | A1 | 4/2012 | Bensman |
| 2012/0152800 | A1 | 6/2012 | Parzy |
| 2012/0152944 | A1 | 6/2012 | Vilkomirski |
| 2012/0160886 | A1 | 6/2012 | Henny |
| 2012/0180250 | A1 | 7/2012 | Ricklefsen |
| 2012/0207571 | A1 | 8/2012 | Scott |
| 2012/0275706 | A1 | 11/2012 | Lesellier |
| 2012/0292213 | A1 | 11/2012 | Brunner |
| 2012/0292870 | A1 | 11/2012 | Cowie et al. |
| 2012/0326406 | A1 | 12/2012 | Lifshitz |
| 2013/0024468 | A1 | 1/2013 | Kocsis |
| 2013/0031731 | A1 | 2/2013 | Hess |
| 2013/0031732 | A1 | 2/2013 | Hess |
| 2013/0068903 | A1 | 3/2013 | O'Keene |
| 2013/0121783 | A1 | 5/2013 | Kelly |
| 2013/0127129 | A1 | 5/2013 | Bensman |
| 2013/0146551 | A1 | 6/2013 | Simpson |
| 2013/0154218 | A1 | 6/2013 | Tiilikainen |
| 2013/0206139 | A1 | 8/2013 | Krepel |
| 2013/0223971 | A1 | 8/2013 | Grace |
| 2013/0239509 | A1 | 9/2013 | Wang |
| 2014/0062042 | A1 | 3/2014 | Wagner |
| 2014/0069832 | A1 | 3/2014 | Roehm |
| 2014/0076759 | A1 | 3/2014 | Roehm |
| 2014/0123478 | A1 | 5/2014 | Gylander |
| 2014/0161518 | A1 | 6/2014 | Ko |
| 2014/0166516 | A1 | 6/2014 | Martinez |
| 2014/0197059 | A1 | 7/2014 | Evans |
| 2014/0205373 | A1 | 7/2014 | Andersson |
| 2014/0263512 | A1 | 9/2014 | McCoy |
| 2014/0265440 | A1 | 9/2014 | Chen et al. |
| 2015/0014949 | A1 | 1/2015 | Dittman |
| 2015/0021371 | A1 | 1/2015 | Ward |
| 2015/0034515 | A1 | 2/2015 | Monyak |
| 2015/0115786 | A1 | 4/2015 | Manalang et al. |
| 2015/0151427 | A1 | 6/2015 | Ben-Gigi |
| 2015/0274362 | A1 | 10/2015 | Christopher |
| 2015/0310842 | A1 | 10/2015 | Coburn |
| 2015/0352711 | A1 | 12/2015 | Brunner |
| 2015/0376917 | A1 | 12/2015 | Brunner |
| 2016/0023349 | A1 | 1/2016 | Hoppe |
| 2016/0130034 | A1 | 5/2016 | Kuhls |
| 2016/0144500 | A1 | 5/2016 | Chen |
| 2016/0168880 | A1 | 6/2016 | Phelan |
| 2016/0213115 | A1 | 7/2016 | Gonitianer |
| 2016/0214451 | A1 | 7/2016 | Harrison |
| 2016/0221177 | A1 | 8/2016 | Reinhart |
| 2016/0244209 | A1 | 8/2016 | Hain |
| 2017/0001655 | A1 | 1/2017 | Huang |
| 2017/0049250 | A1 | 2/2017 | Oren |
| 2017/0065355 | A1 | 3/2017 | Ross |
| 2017/0098513 | A1 | 4/2017 | Horvath |
| 2017/0120679 | A1 | 5/2017 | Naiva |
| 2017/0121056 | A1 | 5/2017 | Wang |
| 2017/0138382 | A1 | 5/2017 | Ko |
| 2017/0143090 | A1 | 5/2017 | Naiva |
| 2017/0158216 | A1 | 6/2017 | Yahav |
| 2017/0165828 | A1 | 6/2017 | Fleischmann |
| 2017/0166352 | A1 | 6/2017 | Hoppe |
| 2017/0174392 | A1 | 6/2017 | De Loynes |
| 2017/0217464 | A1 | 8/2017 | Bar-Erez |
| 2017/0223864 | A1 | 8/2017 | Jost et al. |
| 2017/0239808 | A1 | 8/2017 | Hoppe |
| 2017/0257958 | A1 | 9/2017 | Sabbag |
| 2017/0266804 | A1 | 9/2017 | Kinskey |
| 2017/0274829 | A1 | 9/2017 | Huebner |
| 2017/0318927 | A1 | 11/2017 | Kraus |
| 2017/0349013 | A1 | 12/2017 | Gronholm |
| 2018/0000234 | A1 | 1/2018 | White |
| 2018/0031019 | A1 | 2/2018 | Sjostedt |
| 2018/0044059 | A1 | 2/2018 | Brunner |
| 2018/0099405 | A1 | 4/2018 | Reinhart |
| 2018/0127007 | A1 | 5/2018 | Kravchenko |
| 2018/0141718 | A1 | 5/2018 | Ahlström et al. |
| 2018/0153312 | A1 | 6/2018 | Buck |
| 2018/0161975 | A1 | 6/2018 | Brunner |
| 2018/0186513 | A1 | 7/2018 | Brunner |
| 2018/0201289 | A1 | 7/2018 | Sakakibara et al. |
| 2018/0213934 | A1 | 8/2018 | Wolle |
| 2018/0220758 | A1 | 8/2018 | Burchia |

(56) References Cited

U.S. PATENT DOCUMENTS

| | | | |
|---|---|---|---|
| 2018/0229889 | A1 | 8/2018 | Li |
| 2018/0290288 | A1 | 10/2018 | Brunner |
| 2018/0306487 | A1 | 10/2018 | Huish |
| 2018/0340356 | A1 | 11/2018 | Brennan |
| 2019/0001482 | A1 | 1/2019 | Wolle |
| 2019/0002004 | A1 | 1/2019 | Brunner |
| 2019/0031222 | A1 | 1/2019 | Takyar |
| 2019/0039781 | A1 | 2/2019 | Kogel |
| 2019/0061636 | A1 | 2/2019 | Foster |
| 2019/0106244 | A1 | 4/2019 | Brunner |
| 2019/0111956 | A1 | 4/2019 | Phillips et al. |
| 2019/0135189 | A1 | 5/2019 | Clark |
| 2019/0168376 | A1 | 6/2019 | Brocket |
| 2019/0225371 | A1 | 7/2019 | Hoppe |
| 2019/0225374 | A1 | 7/2019 | McCrea et al. |
| 2019/0247995 | A1 | 8/2019 | Hocine et al. |
| 2019/0359144 | A1 | 11/2019 | Hyatt |
| 2019/0375338 | A1 | 12/2019 | Deninno |
| 2020/0029543 | A1 | 1/2020 | Householder |
| 2020/0038507 | A1 | 2/2020 | Strader |
| 2020/0039553 | A1 | 2/2020 | Abohammdan et al. |
| 2020/0055534 | A1 | 2/2020 | Hassell |
| 2020/0063776 | A1 | 2/2020 | Bastian |
| 2020/0078929 | A1 | 3/2020 | Liu |
| 2020/0079408 | A1 | 3/2020 | Christie |
| 2020/0130440 | A1 | 4/2020 | Fuller |
| 2020/0146447 | A1 | 5/2020 | Brendel |
| 2020/0147781 | A1 | 5/2020 | Squiers |
| 2020/0165036 | A1 | 5/2020 | Squiers |
| 2020/0178686 | A1 | 6/2020 | Hermann et al. |
| 2020/0223585 | A1 | 7/2020 | Brunner |
| 2020/0243925 | A1 | 7/2020 | Polakowski |
| 2020/0284425 | A1 | 9/2020 | Plato et al. |
| 2020/0299027 | A1 | 9/2020 | Brunner |
| 2020/0346819 | A1 | 11/2020 | Kogel |
| 2020/0360741 | A1 | 11/2020 | Liu |
| 2020/0383507 | A1 | 12/2020 | Cox |
| 2021/0025706 | A1 | 1/2021 | Millane |
| 2021/0031975 | A1 | 2/2021 | Brunner |
| 2021/0039831 | A1 | 2/2021 | Brunner |
| 2021/0046882 | A1 | 2/2021 | Schmidt |
| 2021/0094600 | A1 | 4/2021 | Brunner |
| 2021/0104909 | A1 | 4/2021 | Mantych |
| 2021/0104914 | A1 | 4/2021 | Cholst |
| 2021/0154824 | A1 | 5/2021 | Barton |
| 2021/0155373 | A1 | 5/2021 | Cai |
| 2021/0177134 | A1 | 6/2021 | Adams |
| 2021/0187725 | A1 | 6/2021 | Brunner |
| 2021/0205979 | A1 | 7/2021 | Jessop |
| 2021/0221561 | A1 | 7/2021 | Davidian |
| 2021/0245226 | A1 | 8/2021 | Woidasky |
| 2021/0267368 | A1 | 9/2021 | Bruins |
| 2021/0300447 | A1 | 9/2021 | Brunner et al. |
| 2021/0305824 | A1 | 9/2021 | Shirazi et al. |
| 2021/0316667 | A1 | 10/2021 | Pinkston |
| 2021/0316909 | A1 | 10/2021 | Vargo |
| 2021/0360803 | A1 | 11/2021 | Semon |
| 2022/0016799 | A1 | 1/2022 | Westbrook et al. |
| 2022/0017020 | A1 | 1/2022 | McFadden |
| 2022/0097926 | A1 | 3/2022 | Whitmire |
| 2022/0113605 | A1 | 4/2022 | Rathod |
| 2022/0117393 | A1 | 4/2022 | Jenkins |
| 2022/0144326 | A1 | 5/2022 | Williams et al. |
| 2022/0234509 | A1 | 7/2022 | Wright |
| 2022/0240671 | A1 | 8/2022 | Blumenthal |
| 2022/0258324 | A1 | 8/2022 | Blumenthal |
| 2022/0322828 | A1 | 10/2022 | Barton et al. |
| 2022/0369781 | A1 | 11/2022 | Brunner |
| 2022/0379461 | A1 | 12/2022 | Squiers et al. |
| 2022/0402113 | A1 | 12/2022 | Brunner |
| 2023/0020398 | A1 | 1/2023 | Sutton |
| 2023/0027343 | A1 | 1/2023 | Zheng |
| 2023/0036215 | A1 | 2/2023 | Williams |
| 2023/0079766 | A1 | 3/2023 | Wallace |
| 2023/0115200 | A1 | 4/2023 | Barton |
| 2023/0136626 | A1 | 5/2023 | Cai |
| 2023/0150725 | A1 | 5/2023 | Baron et al. |
| 2023/0182281 | A1 | 6/2023 | Keller |
| 2023/0202025 | A1 | 6/2023 | Chen et al. |
| 2023/0232954 | A1 | 7/2023 | Williams |
| 2023/0234212 | A1 | 7/2023 | Lownik et al. |
| 2023/0257163 | A1 | 8/2023 | Fleherty et al. |
| 2023/0301429 | A1 | 9/2023 | Braun |
| 2023/0411975 | A1 | 12/2023 | Roberts et al. |
| 2023/0415957 | A1 | 12/2023 | Camp et al. |
| 2024/0010390 | A1 | 1/2024 | Braun et al. |
| 2024/0025204 | A1 | 1/2024 | Goodwin |
| 2024/0034378 | A1 | 2/2024 | Squiers |
| 2024/0149934 | A1 | 5/2024 | Panosian et al. |
| 2024/0150071 | A1 | 5/2024 | Panosian et al. |
| 2024/0150079 | A1 | 5/2024 | Panosian et al. |
| 2024/0150091 | A1 | 5/2024 | Wu |
| 2024/0150094 | A1 | 5/2024 | Panosian et al. |
| 2024/0190612 | A1 | 6/2024 | Christopher et al. |
| 2024/0200561 | A1 | 6/2024 | Ran et al. |
| 2024/0208040 | A1 | 6/2024 | Coons |
| 2024/0227156 | A1 | 7/2024 | Panosian |
| 2024/0246724 | A1 | 7/2024 | Hoppe et al. |
| 2024/0253207 | A1 | 8/2024 | Baruch et al. |
| 2024/0270445 | A1 | 8/2024 | Brunner |
| 2024/0326707 | A1 | 10/2024 | Taylor |
| 2024/0351744 | A1 | 10/2024 | Tonelli |
| 2024/0359311 | A1 | 10/2024 | Chen |
| 2024/0359632 | A1 | 10/2024 | Sartin |
| 2024/0399967 | A1 | 12/2024 | Deshpande |
| 2024/0409279 | A1 | 12/2024 | Brunner |
| 2025/0002212 | A1 | 1/2025 | Noble |
| 2025/0035143 | A1 | 1/2025 | Braun |
| 2025/0074323 | A1 | 3/2025 | Schroeder |
| 2025/0178540 | A1 | 6/2025 | Sartin |

FOREIGN PATENT DOCUMENTS

| | | | |
|---|---|---|---|
| CN | 2782508 | Y | 5/2006 |
| CN | 200947356 | Y | 9/2007 |
| CN | 101068661 | A | 11/2007 |
| CN | 101362464 | A | 2/2009 |
| CN | 101821148 | A | 9/2010 |
| CN | 101837854 | A | 9/2010 |
| CN | 102042354 | A | 5/2011 |
| CN | 102137795 | A | 7/2011 |
| CN | 102186714 | A | 9/2011 |
| CN | 102248523 | A | 11/2011 |
| CN | 102469899 | A | 5/2012 |
| CN | 20226497 | U | 6/2012 |
| CN | 102608238 | A | 7/2012 |
| CN | 102834035 | A | 12/2012 |
| CN | 302371147 | S | 3/2013 |
| CN | 10311857 | A | 5/2013 |
| CN | 103659777 | A | 3/2014 |
| CN | 204161752 | U | 2/2015 |
| CN | 205238204 | U | 5/2016 |
| CN | 107249378 | A | 10/2017 |
| CN | 107428436 | A | 12/2017 |
| DE | 3510307 | A1 | 9/1986 |
| DE | 9313802 | A1 | 12/1993 |
| DE | 9313802 | U1 | 1/1994 |
| DE | 4415938 | A1 | 11/1995 |
| DE | 29708343 | A1 | 8/1997 |
| DE | 29708343 | U1 | 8/1997 |
| DE | 19750543 | A1 | 5/1999 |
| DE | 20218996 | U1 | 4/2003 |
| DE | 102004057870 | A1 | 6/2006 |
| DE | 202011002617 | U1 | 6/2011 |
| DE | 102010003754 | A1 | 10/2011 |
| DE | 102010003756 | A1 | 10/2011 |
| DE | 102012106482 | A1 | 1/2014 |
| DE | 102012220837 | A1 | 5/2014 |
| DE | 102013008630 | A1 | 11/2014 |
| DE | 202014103695 | U1 | 12/2014 |
| DE | 202015005752 | U1 | 12/2016 |
| DE | 202015105053 | U1 | 12/2016 |
| DE | 202015112204 | A1 | 2/2017 |
| DE | 102015013053 | A1 | 4/2017 |

(56) References Cited

FOREIGN PATENT DOCUMENTS

| | | | |
|---|---|---|---|
| DE | 402018201520.6 | | 11/2018 |
| EM | 000705231-0001 | | 4/2007 |
| EM | 002419283-0001 | | 3/2014 |
| EP | 0916302 | A2 | 5/1999 |
| EP | 1018473 | A1 | 7/2000 |
| EP | 1321247 | A2 | 6/2003 |
| EP | 1428764 | A1 | 6/2004 |
| EP | 1724069 | A2 | 11/2006 |
| EP | 1925406 | A1 | 5/2008 |
| EP | 2289671 | A2 | 3/2011 |
| EP | 2338650 | A2 | 6/2011 |
| EP | 2537641 | A2 | 12/2012 |
| EP | 2543297 | A2 | 1/2013 |
| EP | 2805799 | A2 | 11/2014 |
| EP | 3141354 | A1 | 3/2017 |
| FR | 2368243 | A1 | 10/1976 |
| FR | 3043970 | A1 | 11/2015 |
| GB | 694707 | | 7/1953 |
| GB | 2047181 | A | 11/1980 |
| GB | 2110076 | A | 6/1983 |
| GB | 2211486 | A | 5/1989 |
| GB | 2330521 | A | 4/1999 |
| GB | 2406331 | A | 3/2005 |
| GB | 2413265 | A | 10/2005 |
| GB | 2449934 | A | 12/2008 |
| JP | 2003194020 | A | 7/2003 |
| JP | D 1180963 | | 8/2003 |
| JP | D 276744 | S | 7/2006 |
| JP | D 1395115 | | 8/2010 |
| JP | D 1395116 | | 8/2010 |
| JP | D 1455321 | | 10/2012 |
| JP | 2013022972 | A | 2/2013 |
| JP | 2013022976 | A | 2/2013 |
| JP | D 1477050 | S | 8/2013 |
| JP | 201411796 | A | 6/2014 |
| JP | D 1503434 | | 6/2014 |
| JP | D 1625407 | | 2/2019 |
| JP | D 1665028 | | 8/2020 |
| KR | D3002716160000 | | 12/2000 |
| KR | 3003202430000 | | 3/2003 |
| KR | 3008066040000 | | 7/2015 |
| KR | 3008422360000 | | 3/2016 |
| KR | 3008599650000 | | 6/2016 |
| KR | 3009995990000 | | 3/2019 |
| TW | 206875 | | 1/1982 |
| TW | I24578 | B | 5/2010 |
| TW | D135074 | | 6/2010 |
| TW | D168686 | | 11/2014 |
| TW | D174412 | | 3/2016 |
| TW | D192092 | | 8/2018 |
| WO | 03064115 | A1 | 8/2003 |
| WO | 2005045886 | A2 | 5/2005 |
| WO | 2006058805 | A1 | 6/2006 |
| WO | 2006099638 | A1 | 9/2006 |
| WO | 2007121745 | A1 | 11/2007 |
| WO | 2007121746 | A1 | 11/2007 |
| WO | 2008090546 | A1 | 7/2008 |
| WO | 2009140965 | A1 | 11/2009 |
| WO | 2011000387 | A1 | 1/2011 |
| WO | 2011009480 | A1 | 1/2011 |
| WO | 2011032568 | A1 | 3/2011 |
| WO | 2011124535 | A2 | 10/2011 |
| WO | 2011124536 | A1 | 10/2011 |
| WO | 2011131213 | A1 | 10/2011 |
| WO | 2012000497 | A1 | 1/2012 |
| WO | 2013026084 | A1 | 2/2013 |
| WO | 2014125484 | A1 | 8/2014 |
| WO | 2014125488 | A2 | 8/2014 |
| WO | 2016142935 | A1 | 9/2016 |
| WO | 2016187652 | A1 | 12/2016 |
| WO | 2017028845 | | 2/2017 |
| WO | 2017028845 | A1 | 2/2017 |
| WO | 2017098513 | A1 | 6/2017 |
| WO | 2017191628 | A1 | 11/2017 |
| WO | 2017212840 | A1 | 12/2017 |
| WO | 2018010859 | A1 | 1/2018 |
| WO | 2019213560 | A1 | 11/2018 |
| WO | 2019028041 | A1 | 2/2019 |
| WO | 2019147801 | | 8/2019 |
| WO | 2019147901 | A2 | 8/2019 |
| WO | 2021108374 | A1 | 6/2021 |

OTHER PUBLICATIONS

Neve Produktfamilie: Systemboxen Durchdacht, Komfortabel Uno in Wertigem Design (dated Oct. 19, 2015), Wayback machine archive (dated Dec. 16, 2015), Auer Packaging prSsentiert neue Produktfamilie Systernboxen (dated Sep. 2015), and images ("Auer-Press"), with certified translations.

Kazmer, David. "Design of Plastic Parts." Applied Plastics Engineering Handbook Processing and Materials, edited by Myer Kutz, Elsevier Inc., 2011, pp. 535-551.

Cain, Tristan. "Bird Balder, er-Builder." Brick Journal, Nov. 2013 (Issue 26), pp. 15-16.

Messetermine 2016 (dated Feb. 18, 2016), Wayback machine archive (dated Apr. 4, 2016), Auer Packaging 1111 In-and Ausland present (dated Feb. 2016), and photograph, with certified translations.

Nugent, Paul. "Rotational Molding," Applied Plastics Engineering Handbook Processing and Materials, edited by Myer Kutz, Elsevier Inc., 2011, pp. 311-332.

Cavity. Meriam-Webster's Collegiate Dictionary (11th Ed.), Meriam-Webster, Incorporated, 2020, p. 197.

Forum Post Systainer clone (dated Feb. 15, 2016).

Structure Design', Design Solutions Guide, BASF Corporation. 2007.

General Design Principles for DuPont Engineering Polymers, E.I. du Porn de Nemours and Company, 2000.

International Search Report and Written Opinion for International Application No. PCT/US2018/044629, dated Jan. 9, 2019 (20 pages).

International Search Report and Written Opinion for International Application No. PCT/US2018/033161, dated Aug. 6, 2018 (14 pages).

International Search Report and Written Opinion for International Application No. PCT/US2019/014940, dated Jul. 26, 2019 (7 pages).

Final Rejection issued Nov. 28, 2018, in UU.S. Appl. No. 15/826,232 (14 Pages).

Non-Final Rejection issued Jan. 24, 2019, in United States U.S. Appl. No. 16/216,724 (17 Pages).

Non-Final Rejection issued Apr. 12, 2018, in United States U.S. Appl. No. 15/826,201 (16 Pages).

International Search Report for International Application No. PCT/IL2019/050689, dated Aug. 23, 2019 (21 pages).

International Search Report for International Application No. PCT/IL2020/050433, dated Jun. 21, 2020 (14 pages).

Inter Partes Review No. 2021-00373, "Petition for Inter Partes Review of U.S. Pat. No. 10,583,962" Filed Jan. 5, 2021, 198 pages.

Exhibit 1001 in Petition for Inter Partes Review of U.S. Pat. No. 10,583,962, filed Jan. 5, 2021, 64 Pages.

Exhibit 1002 in Petition for Inter Partes Review of U.S. Pat. No. 10,583,962, filed Jan. 5, 2021, 75 Pages.

Exhibit 1003 in Petition for Inter Partes Review of U.S. Pat. No. 10,583,962, filed Jan. 5, 2021, 13 Pages.

Exhibit 1004 in Petition for Inter Partes Review of U.S. Pat. No. 10,583,962, filed Jan. 5, 2021, 18 Pages.

Exhibit 1005 in Petition for Inter Partes Review of U.S. Pat. No. 10,583,962, filed Jan. 5, 2021, 9 Pages.

Exhibit 1006 in Petition for Inter Partes Review of U.S. Pat. No. 10,583,962, filed Jan. 5, 2021, 176 Pages.

Exhibit 1007 in Petition for Inter Partes Review of U.S. Pat. No. 10,583,962, filed Jan. 5, 2021, 22 Pages.

Exhibit 1008 in Petition for Inter Partes Review of U.S. Pat. No. 10,583,962, filed Jan. 5, 2021, 6 Pages.

Exhibit 1009 in Petition for Inter Partes Review of U.S. Pat. No. 10,583,962, filed Jan. 5, 2021, 24 Pages.

Exhibit 1010 in Petition for Inter Partes Review of U.S. Pat. No. 10,583,962, filed Jan. 5, 2021, 19 Pages.

(56) References Cited

OTHER PUBLICATIONS

Exhibit 1011 in Petition for Inter Partes Review of U.S. Pat. No. 10,583,962, filed Jan. 5, 2021, 26 Pages.
Exhibit 1012 in Petition for Inter Partes Review of U.S. Pat. No. 10,583,962, filed Jan. 5, 2021, 3 Pages.
Exhibit 1013 in Petition for Inter Partes Review of U.S. Pat. No. 10,583,962, filed Jan. 5, 2021, 168 Pages.
Exhibit 1014 in Petition for Inter Partes Review of U.S. Pat. No. 10,583,962, filed Jan. 5, 2021, Part A pp. 1-166 of 481 pages.
Exhibit 1014 in Petition for Inter Partes Review of U.S. Pat. No. 10,583,962, filed Jan. 5, 2021, Part B pp. 167-320 of 481 pages.
Exhibit 1014 in Petition for Inter Partes Review of U.S. Pat. No. 10,583,962, filed Jan. 5, 2021, Part C pp. 321-481 of 481 Pages.
Exhibit 1015 in Petition for Inter Partes Review of U.S. Pat. No. 10,583,962, filed Jan. 5, 2021, 6 Pages.
Exhibit 1016 in Petition for Inter Partes Review of U.S. Pat. No. 10,583,962, filed Jan. 5, 2021, 242 Pages.
Exhibit 1017 in Petition for Inter Partes Review of U.S. Pat. No. 10,583,962, filed Jan. 5, 2021, 6 Pages.
Exhibit 1018 in Petition for Inter Partes Review of U.S. Pat. No. 10,583,962, filed Jan. 5, 2021, 250 Pages.
Exhibit 1019 in Petition for Inter Partes Review of U.S. Pat. No. 10,583,962, filed Jan. 5, 2021, 44 Pages.
Exhibit 1020 in Petition for Inter Partes Review of U.S. Pat. No. 10,583,962, filed Jan. 5, 2021, 5 Pages.
Exhibit 1021 in Petition for Inter Partes Review of U.S. Pat. No. 10,583,962, filed Jan. 5, 2021, 1 Pages.
Exhibit 1022 in Petition for Inter Partes Review of U.S. Pat. No. 10,583,962, filed Jan. 5, 2021, 1 Pages.
Exhibit 1023 in Petition for Inter Partes Review of U.S. Pat. No. 10,583,962, filed Jan. 5, 2021, 24 Pages.
Exhibit 1024 in Petition for Inter Partes Review of U.S. Pat. No. 10,583,962, filed Jan. 5, 2021, 28 Pages.
Final Rejection issued Nov. 28, 2018, in U.S. Appl. No. 15/826,201 (17 Pages).
Extended European search report for application No. 18892505.1 dated Sep. 17, 2021 (7 Pages).
Auer Packaging 1 2016 ("Auer-Catalog").
FloTool 91002 Rhino Box with Mount, Amazon.com: FloTool 91002 Rhino Box with Mount Automotive, URL: https://www.amazon.com/exec/obidos/ASIN/B003K15F3I/20140000-20, May 21, 2025.
Blitz Box—Portable Storage Box / Shelf, Blitz Box—Portable Storage Box / Shelf | The Green Head, URL: Blitz Box Portable Storage Box / Shelf | The Green Head, May 21, 2025.
Milwaukee Tool, Packout Dolly, Zoro, 2019.
Ryobi ToolBlox Tool Cabinet System! Toolguyd, URL: https://toolguyd.com/ryobi-toolblox-cabinets/, Sep. 19, 2014.
Robert Auer, Auer Packaging, 2016.
Sys-Cart Base, a Systainer Mounting Platform, Toolguyd, URL: https://toolguyd.com/systainer-sys-cart-mounting-base/, Jul. 28, 2014.
Exhibit 1025 in "Petition for Inter Partes Review of U.S. Pat. No. 11,794,952" Filed Sep. 17, 2024, 15 pages.
Exhibit 1026 in "Petition for Inter Partes Review of U.S. Pat. No. 11,794,952" Filed Sep. 17, 2024, 37 pages.
Exhibit 1027 in "Petition for Inter Partes Review of U.S. Pat. No. 11,794,952" Filed Sep. 17, 2024, 7 pages.
Exhibit 1028 in "Petition for Inter Partes Review of U.S. Pat. No. 11,794,952" Filed Sep. 17, 2024, 33 pages.
Exhibit 1030 in "Petition for Inter Partes Review of U.S. Pat. No. 11,794,952" Filed Sep. 17, 2024, 95 pages.
Exhibit 1031 in "Petition for Inter Partes Review of U.S. Pat. No. 11,794,952" Filed Sep. 17, 2024, 5 pages.
Exhibit 1032 in "Petition for Inter Partes Review of U.S. Pat. No. 11,794,952" Filed Sep. 17, 2024, 60 pages.
E1—"Furniture Mechanics", 1993, pp. 124-125 and Machine translation to English.
E2—"Advanced Manufacturing Technology", 2005, p. 59 and Machine translation to English.

* cited by examiner

SAWHORSE

BENEFIT CLAIM

This application is a United States national stage entry of PCT International Application No. PCT/IL2020/051019 entitled "SAWHORSE", filed in Israel on Sep. 16, 2020, which claims priority to Israel Patent Application No. 269564, filed on Sep. 23, 2019, the contents of which are herein incorporated in their entirety by reference for all purposes.

TECHNOLOGICAL FIELD

The present disclosure concerns a sawhorse. More particularly the disclosure concerns a sawhorse configured with an articulation system.

Hereinafter in the specification and claims, the term sawhorse is used in its broad sense and denotes a foldable and carriable work station, also referred to in the art as workmate, workbench, worktable, etc.

BACKGROUND ART

References considered to be relevant as background to the presently disclosed subject matter are listed below:

U.S. Pat. No. 9,844,870

U.S. Pat. No. 9,844,870

US 2016/0221177

Acknowledgement of the above references herein is not to be inferred as meaning that these are in any way relevant to the patentability of the presently disclosed subject matter.

BACKGROUND

U.S. Pat. No. 9,844,870 discloses a sawhorse system, comprising: a sawhorse; and a tool holder, having a plurality of sides including a first side, a second side, a third side, and a fourth side, each of the first side and the second side having a free top edge, a bottom edge, a first end edge, and a second end edge, the free top edge of the first side spaced apart from the free top edge of the second side, the third side disposed intermediate and connecting the first end edges of the first side and the second side, and the fourth side disposed intermediate and connecting the second end edges of the first side and the second side, a plurality of pockets attached the plurality of the sides, one of the pockets attached to each of the third side and the fourth side, a first strap directly attached to the free top edge of each of the first side and the second side, and connecting the first side and the second side, a second strap directly attached to the free top edge of each of the first side and the second side, and connecting the first side and the second side, the second strap laterally spaced apart from the first strap, and the free top edges of the first side and the second side are not otherwise connected, a third strap attached at the first end edges of the first side and the second side, the third strap connecting the first side and the second side, wherein the third strap is spaced apart from the one of the pockets on the third side, and an opening is formed between the third strap and the one of the pockets attached to the third side, and the third strap is coplanar with the third side, and a fourth strap attached at the second end edges of the first side and the second side, the fourth strap connecting the first side and the second side, wherein the fourth strap is spaced apart from the one of the pockets on the fourth side, and an opening is formed between the third strap and the one of the pockets attached to the fourth side, and the fourth strap is coplanar with the fourth side, wherein the tool holder is selectively disposed over the sawhorse and is movable between an expanded position and a collapsed position.

U.S. Pat. No. 6,305,498 discloses a sawhorse, comprising a base assembly including a pair of support members each formed from a plastic material, said support members being connected to one another for movement between an open working configuration in which the base assembly is self-supporting in an upright position and a closed storage configuration; a workpiece support structure mounted on said base assembly and defining an upwardly facing support surface for supporting a workpiece when the base assembly is in the self-supporting upright position thereof; and an attachment for said base assembly in the form of a tool carrier assembly comprising a flexible carrier sheet, a plurality of tool holding elements affixed to said carrier sheet and a plurality of fasteners fixedly affixing said carrier sheet to one of said pair of support members in a configuration providing access to tools held by said tool holding elements when said base assembly is in the open working configuration thereof, the tool carrier assembly being positioned (a) such that the tool carrier assembly is below the workpiece support surface to allow the support surface to support a workpiece without interference from said tool carrier assembly and (b) such that said tool carrier assembly does not impede movement of the base assembly between said closed storage configuration and said open working configuration.

US Application 2016/0221177 discloses a sawhorse includes a first side body and a second side body. Each of the first side body and the second side body has a first cross member, a second cross member, a first leg portion with a foot, and a second leg portion with a foot. The first cross member of the first side body is rotatably coupled to the first cross member of the second side body. The first side body and the second side body are positionable between a closed position and an opened position. The sawhorse further includes a centrally hinged, folding platform that is rotatably coupled to the second cross member of each of the first side body and the second side body. Where in the open position, the folding platform is fully deployed to create a substantially planar surface spanning the second cross members of the first side body and the second side body.

GENERAL DESCRIPTION

The present disclosure is directed to a sawhorse comprising a first support frame and a second support frame, each having a first face and a second face, respectively, said second support frame articulated to the first support frame, whereby the sawhorse is manipulable between at least one collapsed position and at least one deployed position; and wherein at least one of the first face and the second face of at least one of the first support frame and the second support frame is configured with an array of articulation locations for detachably attaching one or more utility units to the sawhorse and for detachably attaching the sawhorse to a carrying member.

The term utility unit as used herein denotes any article of utility, either stationary of mobile, having a utility and being detachably attachable to a sawhorse according to the disclosure or to other utility units. A utility unit, according to the present disclosure can be, by way of example, any type of container, work surface, locomotion system, mounting system, hand tool, support element, and the like.

The term carrying member as used herein denotes any surface to which a sawhorse according to the present disclosure can be detachably articulated. By way of example, a carrying member can be a wall surface, a mounting plate, a container wall surface, a cabinet wall surface, and the like.

According to a specific configuration of the disclosure, the articulation location comprises a male-female type coupling arrangement, wherein the sawhorse is configured with one or more male couplers or a female couplers and where the utility unit and carrying member are configured with the other one of male couplers or female couplers.

The sawhorse can further be configured with a locking mechanism associated with the articulation locations, to prevent spontaneous detaching of a utility unit from the sawhorse, i.e. to prevent unintentional separation of the utility unit from a support frame or of the sawhorse from a carrying member.

According to a specific example of the disclosure, there is provided a sawhorse comprising a first support frame and a second support frame pivotally articulated to one another at their respective top portions, each having a first face and a second face, respectively, wherein said first faces face each other and where the sawhorse is manipulable between at least one collapsed position and at least one deployed position; and wherein the second face of at least one of the first support frame and the second support frame is configured with an array of articulating elements (or articulation locations) for detachably attaching one or more utility units to the sawhorse and for detachably attaching the sawhorse to a carrying member.

According to a particular example, the first frame and the second frame are articulated to one another at their respective top portions and wherein at the deployed position the sawhorse has an upside-down V-like shape.

The arrangement can be such that attaching a utility unit over the sawhorse and likewise attaching the sawhorse to a carrying member is easily and readily facilitated by sliding the respective member over the other into engagement with the respective articulation location so that the one or more male-female couplers engage, and the locking mechanism, if applied, snaps into engagement. Detaching a utility unit from the sawhorse and likewise detaching the sawhorse from the carrying member is facilitated by disengaging the locking mechanism, if applied, and sliding the male-female couplers to disengage and away from one another.

Sliding engagement and disengagement take place along a sliding path extending substantially parallel to the male-female couplers members.

Any one or more of the following features, designs and configurations can be applied to the sawhorse according to the present disclosure, separately and in various combinations thereof:

- The first support frame and the second support frame can be pivotally articulated to one another at their respective top portions;
- The first support frame and the second support frame can be pivotally articulated to one another at their respective top ends;
- One of the first support frame and the second support frame can be articulated to the other one of the first support frame and the second support frame at a location between a top end and a bottom end of the other one of the first support frame and the second support frame;
- One or both of the first support frame and the second support frame can have a rectangular shape;
- The sawhorse can be made of metal or molded resin;
- At the collapsed position, the first support frame and the second support frame can extend parallel to one another;
- At the collapsed position, facing faces of the first support frame and the second support frame can extend flush against one another;
- One or both of the first support frame and the second support frame can comprise at least one height adjusting leg member;
- The first support frame and the second support frame can be similar to one another, or identical, and can be interchangeable;
- The first support frame and the second support frame can be articulated to one another through one or more interconnecting frame members;
- The array of articulation locations can facilitate simultaneous attachment of one or more utility units to a surface of a support frame;
- The first support frame and the second support frame can be configured at their top end with integral intervening axle portions for pivotally coupling the first and second support frames to one another;
- The array of articulation locations can include one or more such articulation locations, for detachably attaching thereto one or more utility units, and wherein a utility unit can be attached over one or more such articulation locations; i.e. an array of articulation locations can be a set of couplers or a unitary coupling;
- Either one or both faces of each of the first support frame and the second support frame can be configured with articulation locations, the articulation locations can be any of male articulation locations and female articulation locations; for example, one face of one of the first support frame and the second support frame can be configured with male articulation locations and another face of the support frame can be configured with male or female articulation locations;
- A face of a support frame can be configured with a combination of male and/or female articulation locations;
- The first support frame and the second support frame can be swingable between a collapsed position and at least one deployed position;
- At least one of the first support frame and the second support frame can be swingable about the other one of the first support frame and the second support frame substantially about 360°;
- A top end of the sawhorse can be configured with a utility portion; the utility portion can be a workpiece grip, a vise, a top bar, etc.;
- The locking mechanism can be a locking latch extending from one of a support frame and a utility unit or carrying member, and configured for arresting within a locking receptacle within the other one of a support frame and a utility unit or carrying member;
- The locking latch can be configured for spontaneous snap engagement within the locking receptacle;
- The articulation locations can be integral with the sawhorse frame, or integrated therewith;
- One or more articulation locations can be disposed over a side portion of the first support frame and the second support frame;
- The sawhorse can be configured with a span-restricting member, for restricting angular displacement between the first support frame and the second support frame;
- A span-restricting member can be a support member configured with one or more articulating locations;

According to one particular arrangement, a face of at least one of the first support frame and the second support frame defines an articulation face, and the articulation locations comprise at least one male coupler at one of the articulation face and a face of the utility unit, and a female coupler at the other one of the articulation face and the face of the utility unit, said female coupler having a depressed locking location configured with at least one locking rib extending above a depressed plane and along a sliding path, and having an open edge facing in a first sense; said male coupler having a projecting locking location disposed in register with said depressed locking location and configured with at least one locking tongue extending along said engaging sliding path at a second sense, opposite to said first sense, and configured for arresting engagement at a space between said locking rib and depressed plane;

The at least one locking rib of the articulation locations can extend substantially parallel to the sliding path;

The at least one locking rib can extend substantially perpendicular and intersect the sliding path;

The female coupler can comprise a single locking rib extending at rear end of the depressed locking location and substantially perpendicular to the sliding path;

The female coupler can comprise two locking ribs extending at side edges of the depressed locking location and disposed substantially parallel to the sliding path;

The female coupler can comprise two locking ribs each extending at a respective side edge of two neighboring depressed locking locations, said locking ribs disposed substantially parallel to the sliding path;

The coupling arrangement can be configured such that engaging the utility unit with the articulation face of the sawhorse is facilitated by sliding the utility unit with respect to the utility unit articulation face along a sliding path defined by at least one of said at least one locking rib and said at least one locking tongue;

The coupling arrangement can be configured for snap-type locking of a utility unit over the a utility unit articulation face;

The locking mechanism can comprise at one of the articulation face and a face of the utility unit, a locking latch arresting location, and the other one of said articulation face and a face of the utility unit a locking member displaceable and disposed in register with said locking latch arresting location, wherein at a locked position the locking member is arrested by the corresponding locking latch arresting location, and further wherein disengaging the utility unit from the sawhorse is facilitated by disengaging the at least one locking latch from the at least one locking latch arresting location;

The locking mechanism can further comprise a release latch for displacing the locking latch into disengagement from the locking latch arresting location;

The locking mechanism can be spring biased and configured for normally projecting from a face of the utility unit or from the articulation face of the sawhorse;

The locking latch can be associated with and extend from a male coupler element.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Figure 1B:
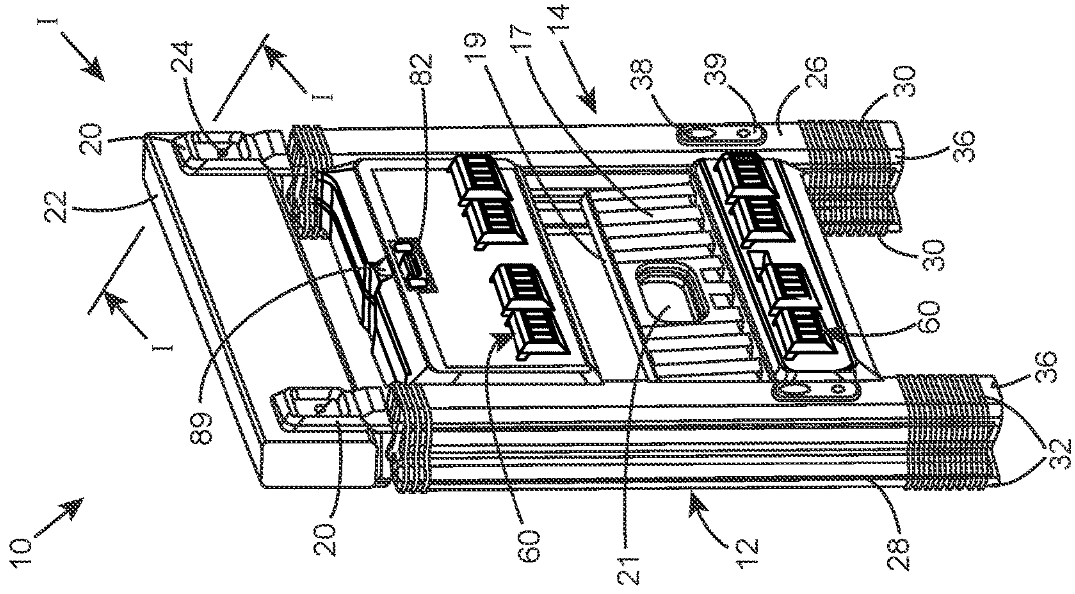
FIG. 1B is a perspective view of the sawhorse of FIG. 1A with male articulation locations.
Figure 1A:
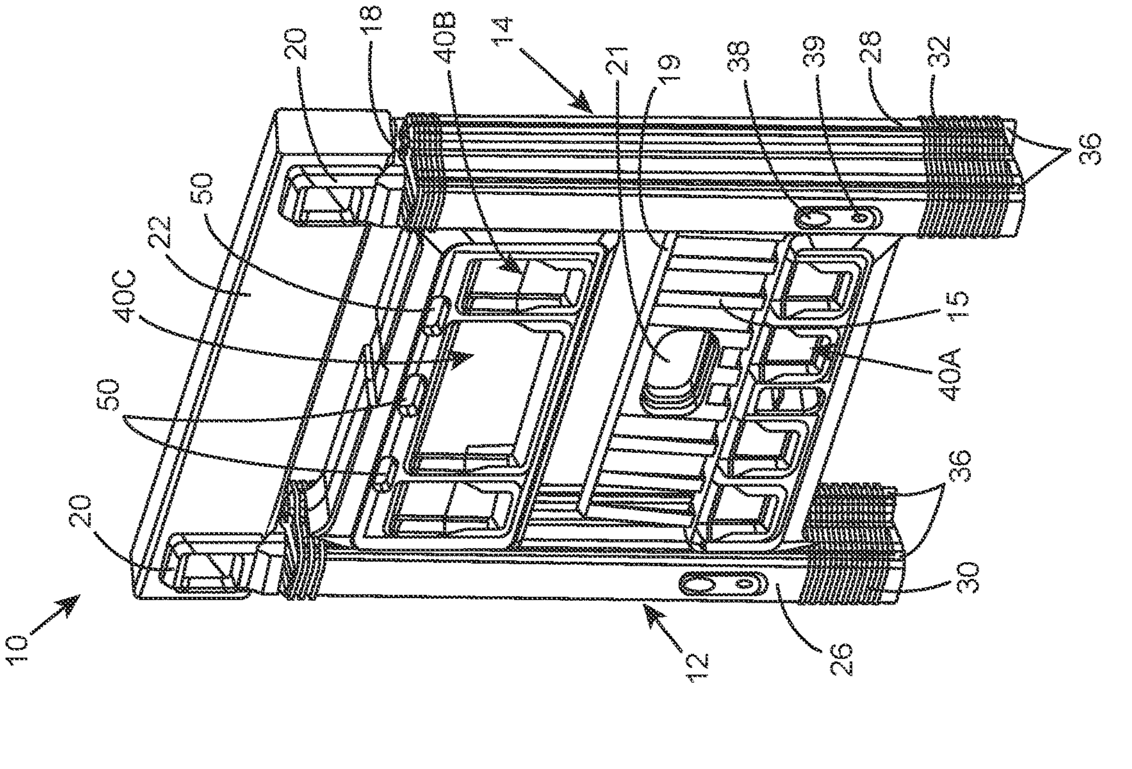
FIG. 1A is a perspective view of a sawhorse according to an example of the present disclosure with female articulation locations, the sawhorse at its collapsed position.
Figure 1D:
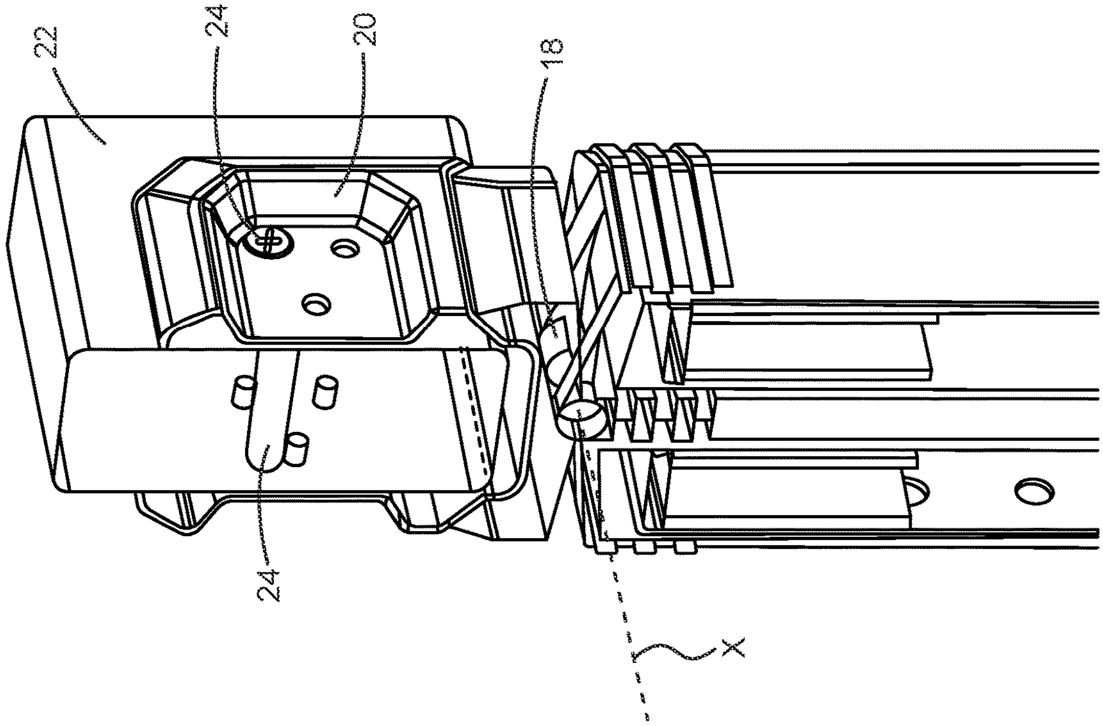
FIG. 1D is a section taken through a top portion of the sawhorse, along line I-I in FIG. 1B.
Figure 1C:
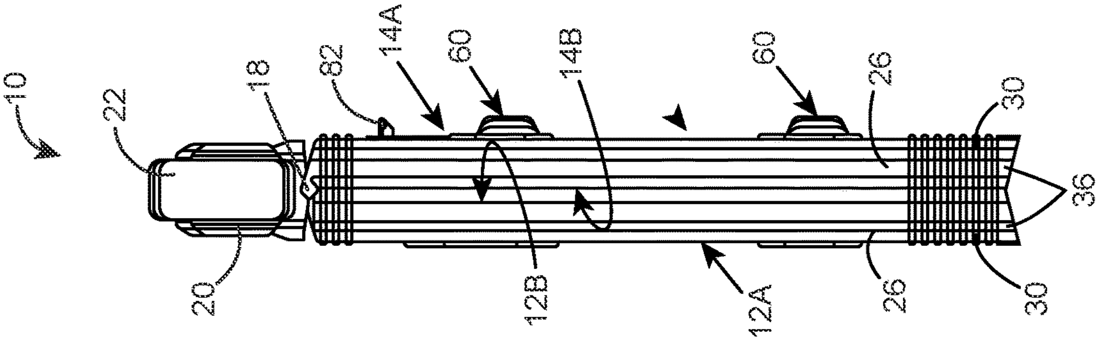
FIG. 1C is a side view in direction of arrow I in FIG. 1B.
Figure 2A:
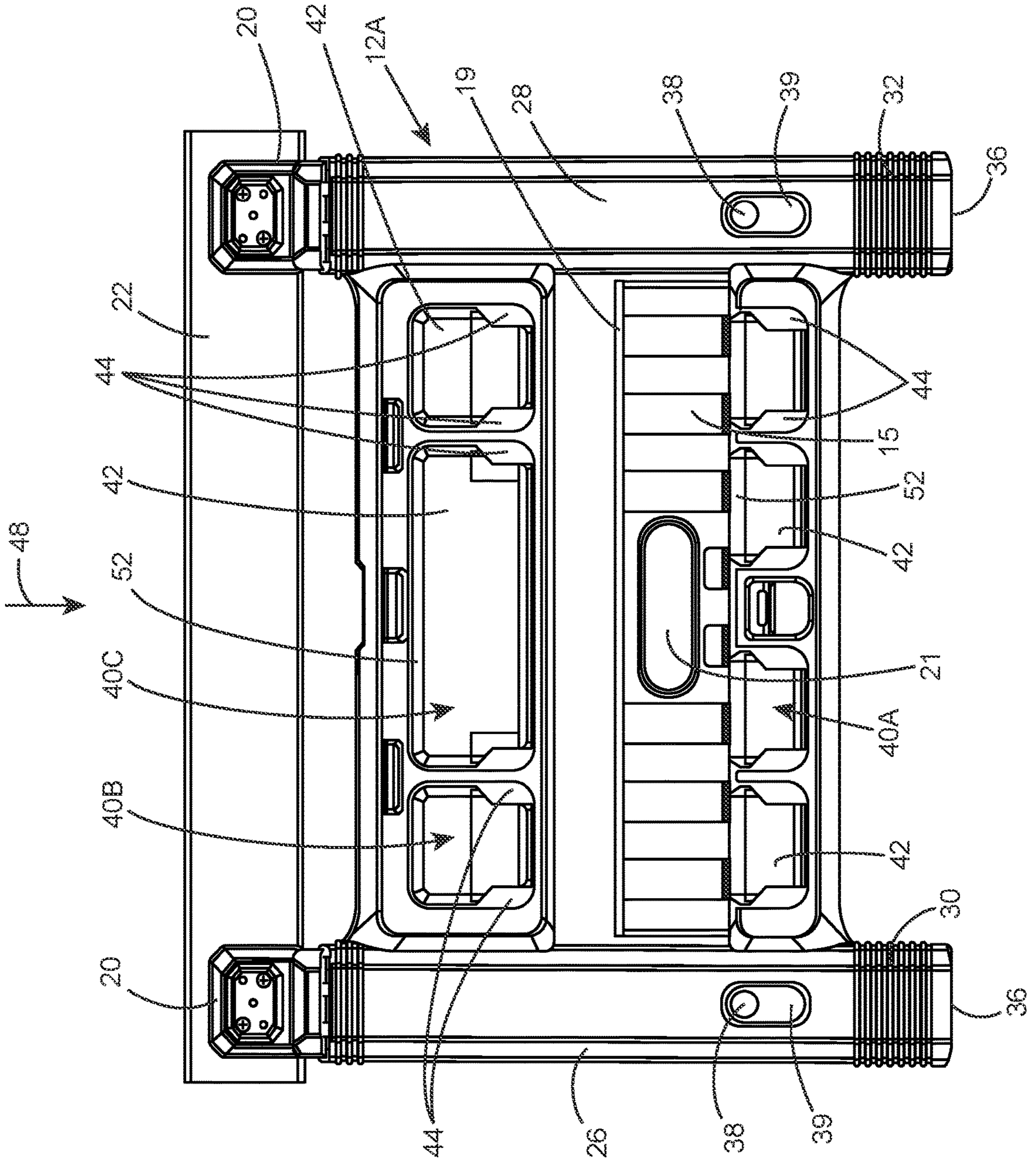
FIG. 2A is a planer view of the female side of the sawhorse.
Figure 2B:
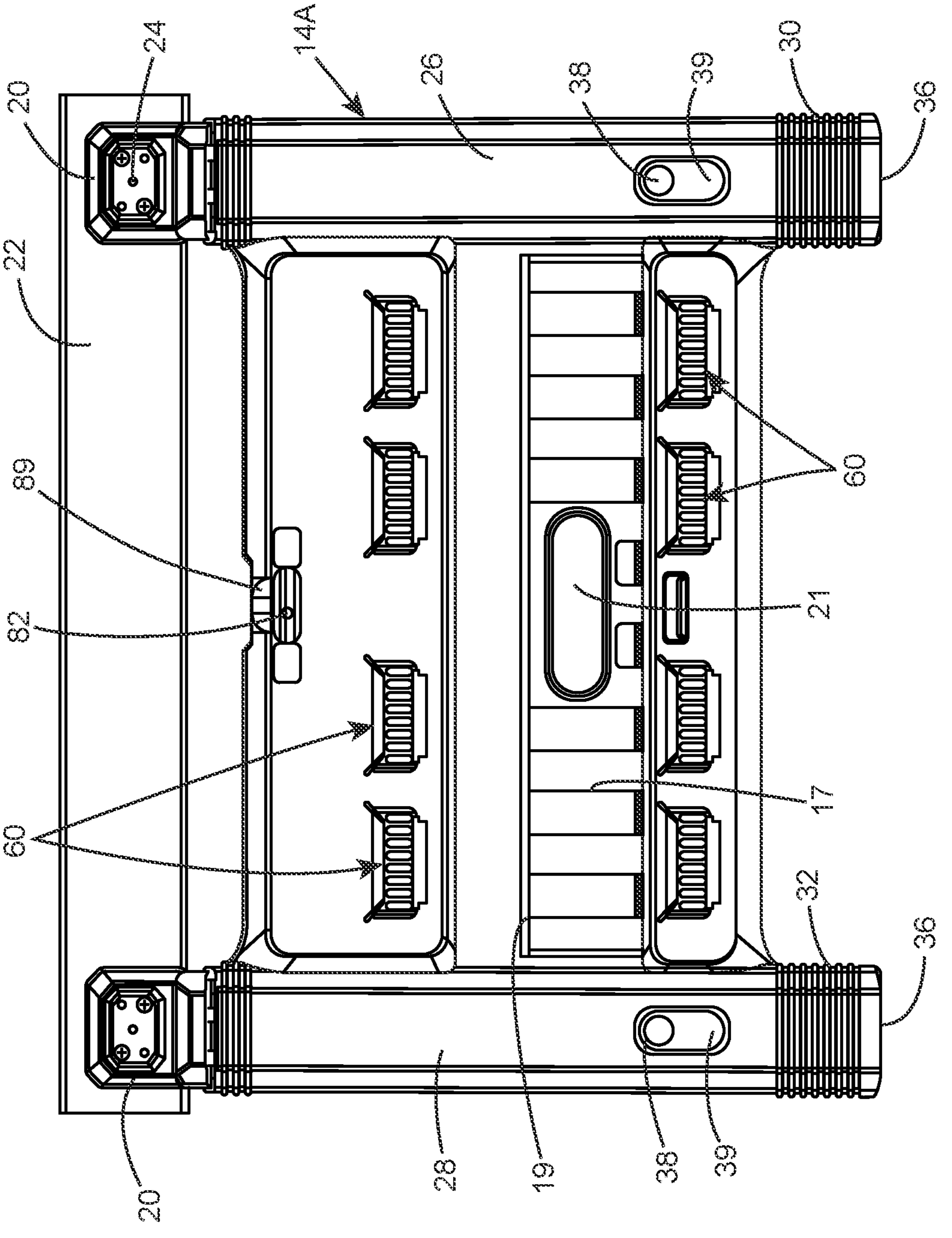
FIG. 2B is a planer view of the male side of the sawhorse.
Figure 3A:
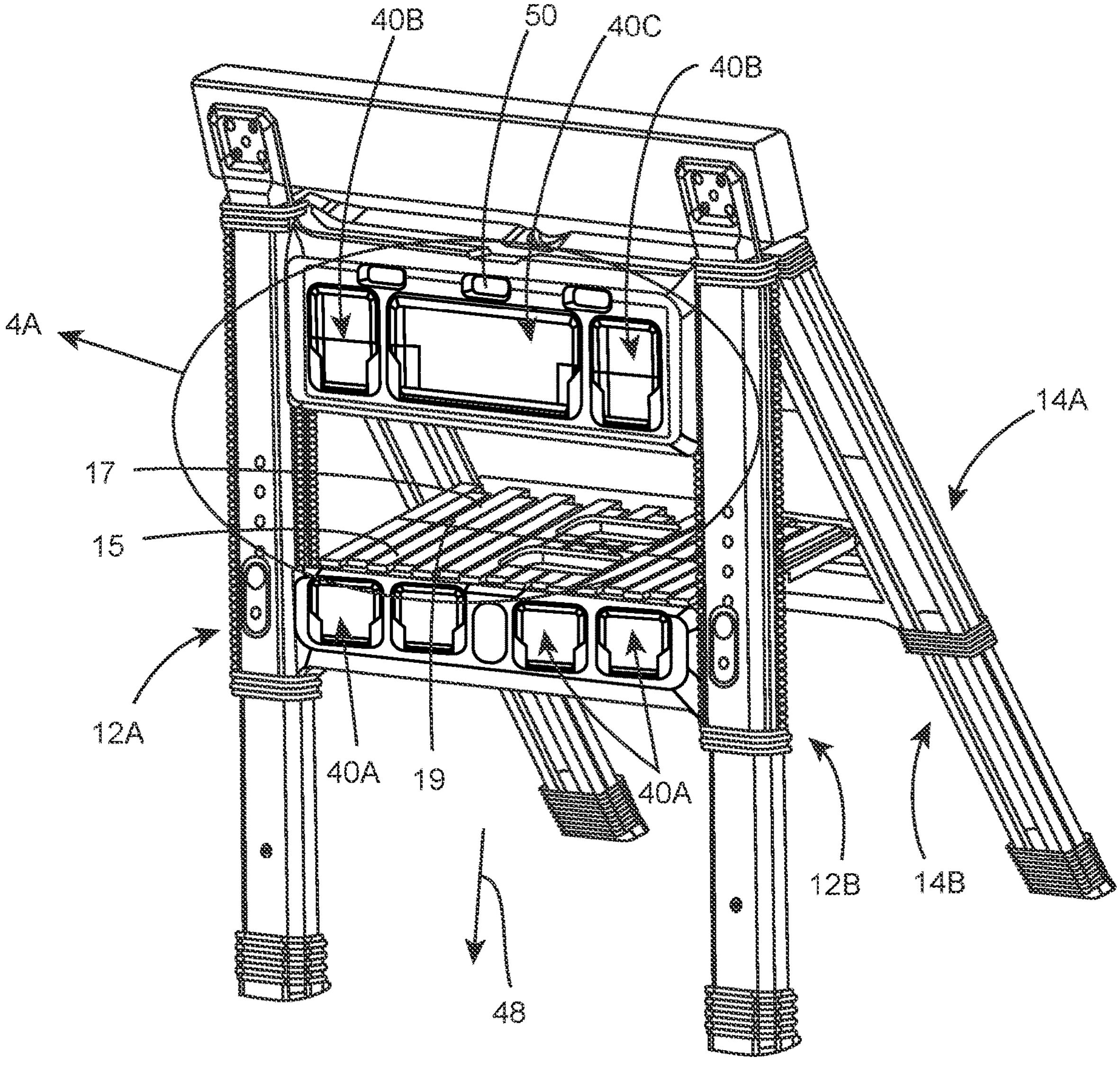
FIG. 3A is a side perspective view of the sawhorse at a deployed, extended position with female articulation locations.
Figure 3B:
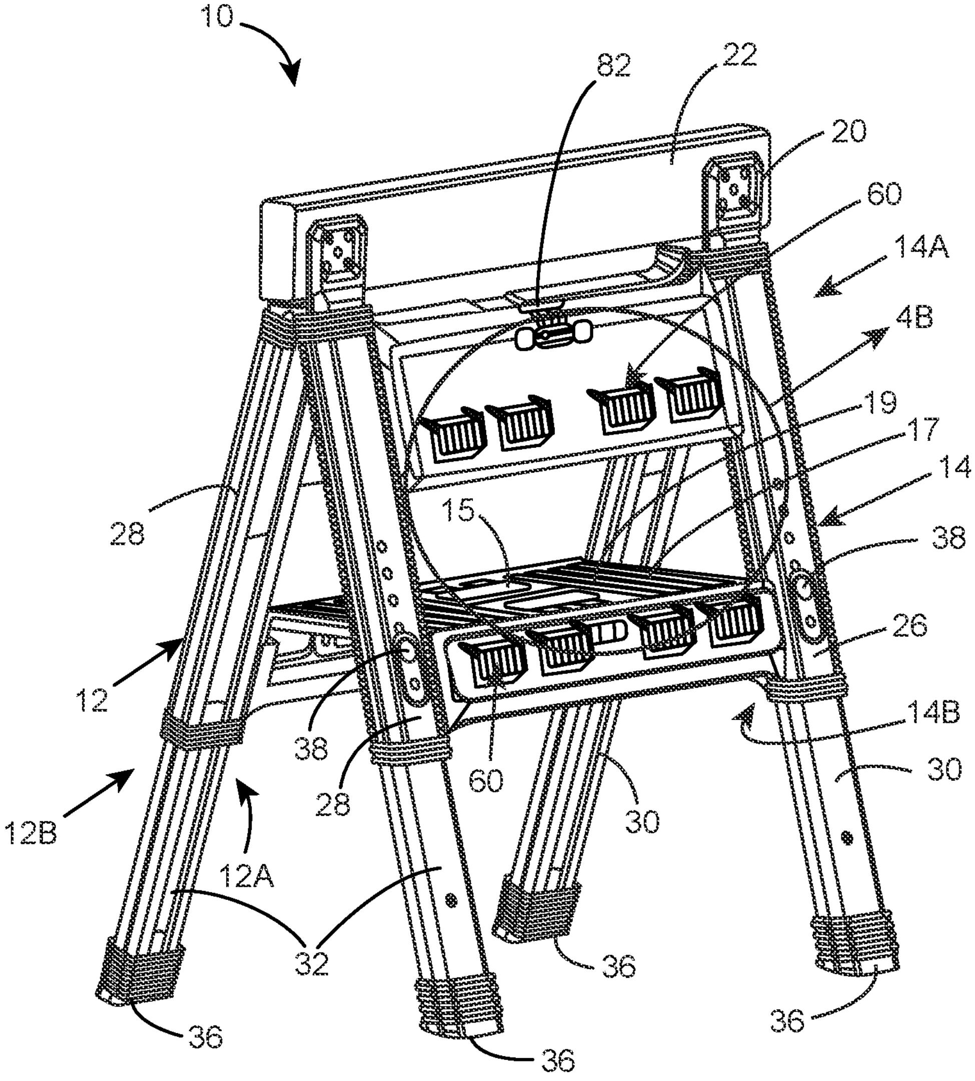
FIG. 3B is a male side perspective view of the sawhorse of FIG. 3A.

Attention is directed first to FIGS. 1A to 3B, illustrating a sawhorse according to the present disclosure, generally designated 10. The sawhorse 10 comprises a first support frame 12 and a second support frame 14, both having a similar, generally rectangle shape, and each having a first face 12A and 14A and a second face 12B and 14B, respectively. For sake of example and clarification, in the present example the first face 12A and 14A are referred to as outside faces of the frames (i.e. facing away from each other) and the second face 12B and 14B are referred to as inside faces of the frames (i.e. facing towards each other). The first support frame 12 and the second support frame 14 are pivotally articulated to one another at their respective top ends at a pivot axle 18, along an axis X (best seen in FIG. 1D), such that the sawhorse 10 is configurable between a collapsed/folded position (FIGS. 1A to 1D) and a deployed/expanded position (FIGS. 3A and 3B).

The sawhorse 10 is further configured with a span-restricting arrangement comprising a first pivotal shelf-like member 15 extending from a first, inside face 12B of the first support frame 12, and a second, oppositely extending pivotal shelf-like member 17 extending from a second, inside face 14B of the second support frame 14. Shelf-like members 15 and 17 are pivotally articulated to one another at 19, and configured for restricting angular displacement between the first support frame 12 and the second support frame 14, so as to retain the sawhorse at a fixed and stable deployed position. At the deployed position, shelf-like members 15 and 17 extend coplanar and serve together as a shelf member. The restricting shelf-like members 15 and 17 displace into the coplanar shelf-like position upon deploying the sawhorse into its operable, open/deployed position. Each of the shelf-like member 15 and 17 is further configured with an opening 21, which at the collapsed position are in register with one another, serving together as a carrying handle. However, it is appreciated that other restricting arrangements can be configured, such as a strap or a sling extending between the first support frame 12 and the second support frame 14.

Extending at a top of each side end of the sawhorse 10, there are one or more U-like workpiece supports 20, in this example two workpiece supports 20 coextending and supporting a rectangular support beam 22 which can be integral with the two workpiece supports 20 or articulated thereto through fasteners 24 (better seen in FIG. 1D), rendering it replaceable.

The first support frame 12 and the second support frame 14 comprise each two side leg members 26 and 28. Each side leg member 26 and 28 is configured with an extension leg portion 30 and 32, respectively, telescopically received within the respective side leg members 26 and 28, and each comprising at a bottom end thereof an anti-slip shoe 36. The extension leg portions 30 and 32 are selectively arrested at a desired level within the respective side leg members 26 and 28 by any one of several snap tabs 38 configured for protecting and arresting through an arresting opening 39 formed at the side leg members 26 and 28.

In the present example, the first face 12A of the first support frame 12 (namely the outside face thereof) is configured with an array of female-type articulation locations 40A, 40B and 40C (being of different size though having the same arresting arrangement as will be discussed), as will be discussed hereinafter in detail.

Further in present example, the first face 14A of the second support frame 14 (namely the outside face thereof) is configured with an array of male-type articulation locations 60, as will be discussed hereinafter in detail.

Figure 4A:
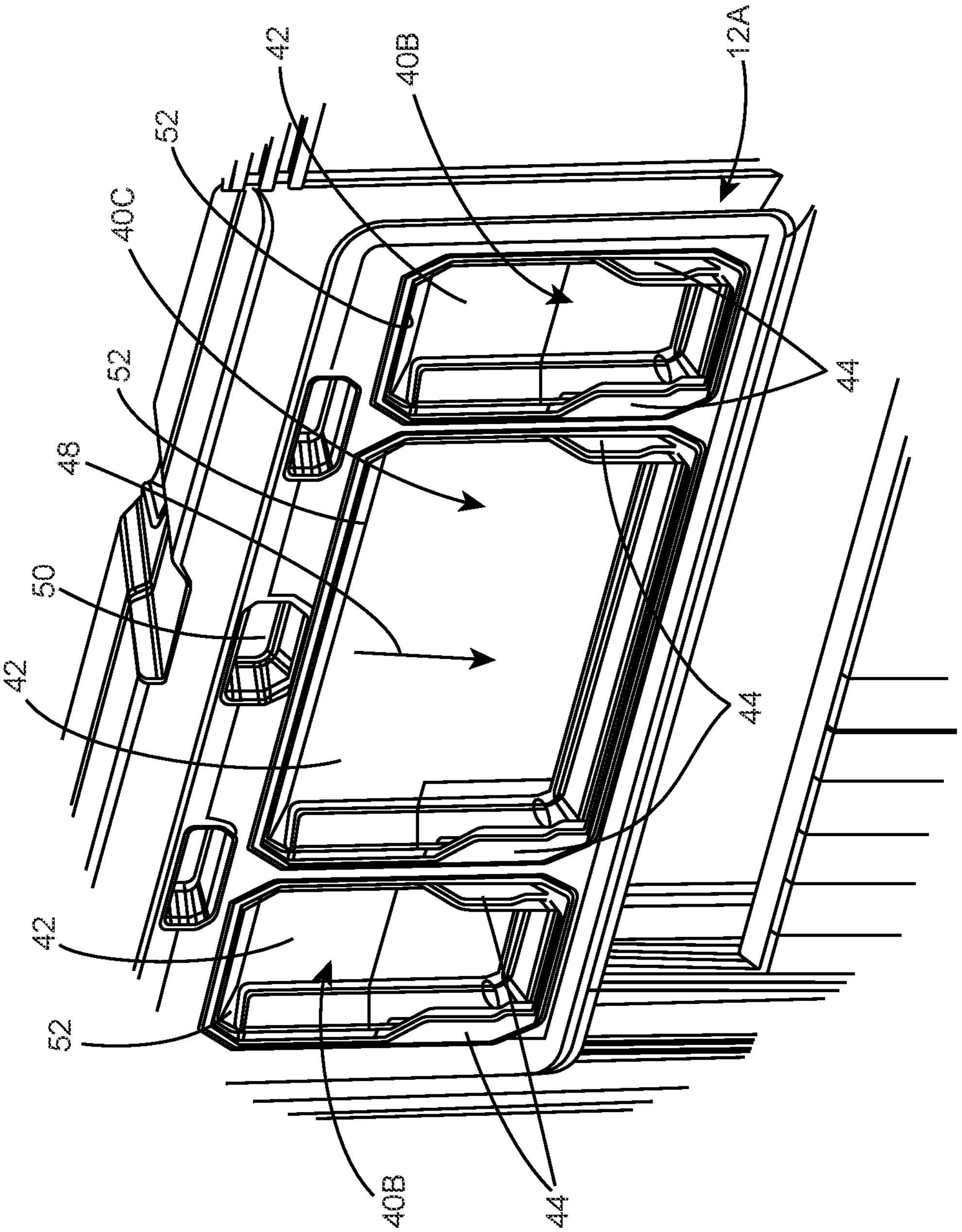
FIG. 4A is an enlargement of the portion marked 4A in FIG. 3A.
Figure 5A:
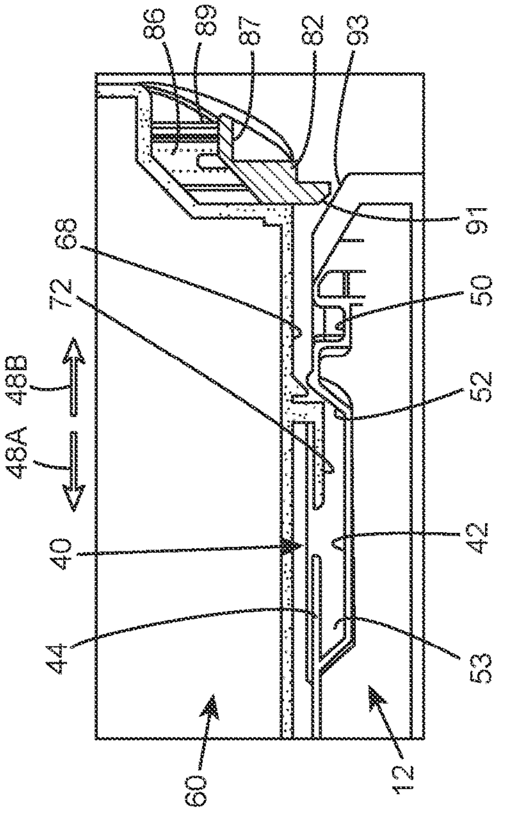
FIGS. 5A and 5B are locally sectioned views along line II-II in FIG. 10A, illustrating consecutive steps of interlocking a utility unit container to the sawhorse, by an articulation arrangement according to the disclosure.

With particular reference to FIG. 4A, the female-type articulation locations 40A, 40B and 40C (collectively designated 40) each comprise a depressed locking surface 42 configured with a pair of parallelly disposed locking ribs 44 facing towards one another and extending above the depressed surface 42 and along a sliding path 48 (which is the orientation at which a utility unit is displaced over during articulation, wherein 48A is the locking direction and 48B is the unlocking direction), and having a slanted open edge 52 facing in a first sense along the sliding path 48. An outside surface of the locking ribs 44 is substantially flush with a sliding surface of the face 12A; a space 53 (FIGS. 5A and 5B) extends between the locking ribs 44 and the depressed surface 42 and it is seen that a bottom face of the locking ribs 44 extends substantially parallel to said depressed surface 42.

The outside, first face 12A of the first support frame 12 is further configured with at least one locking latch arresting location, i.e. recess 50, the purpose of which will be discussed below.

Figure 7:
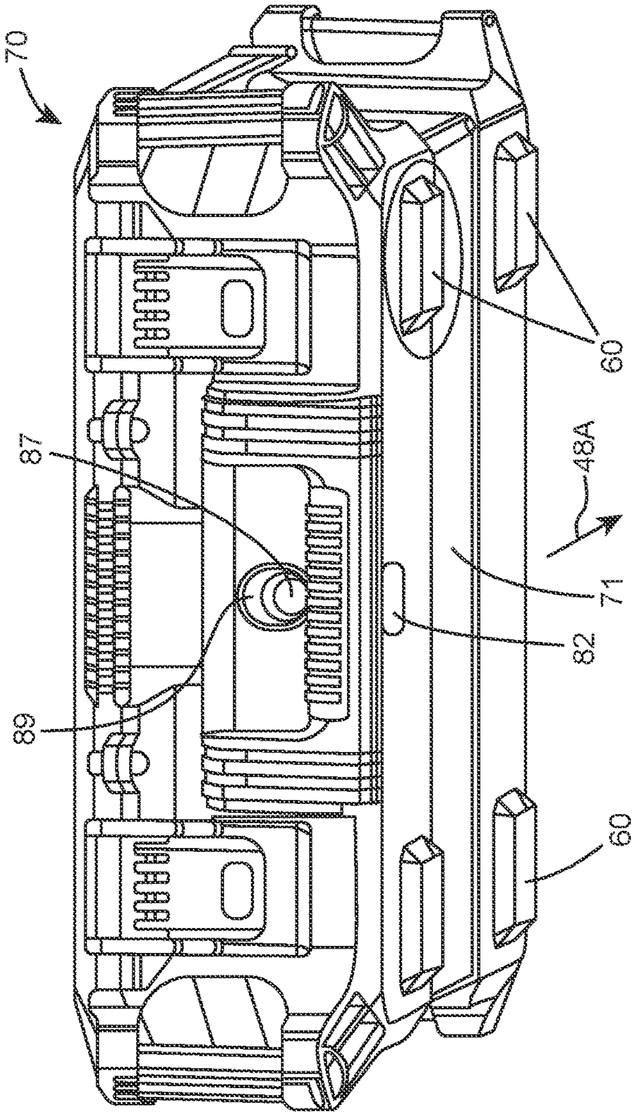
FIG. 7 is a bottom perspective view of a container configured with male couplers according to an aspect of the disclosure.
Figure 8B:
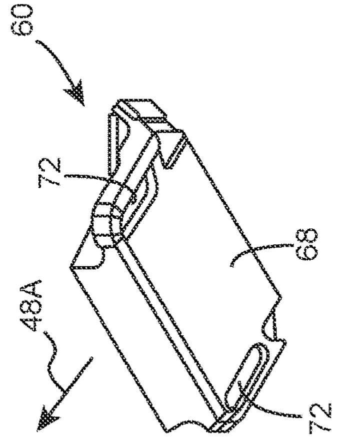
FIG. 8B is an enlarged rear perspective view of the male coupler.
Figure 8A:
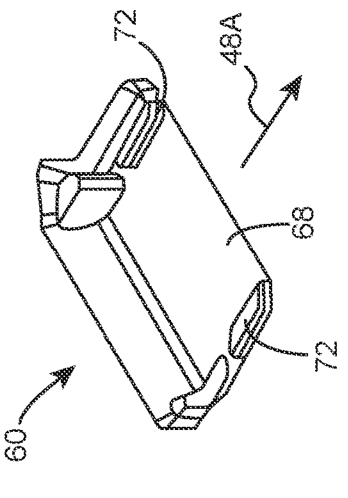
FIG. 8A is an enlarged front perspective view of a male coupler.
Figure 9B:
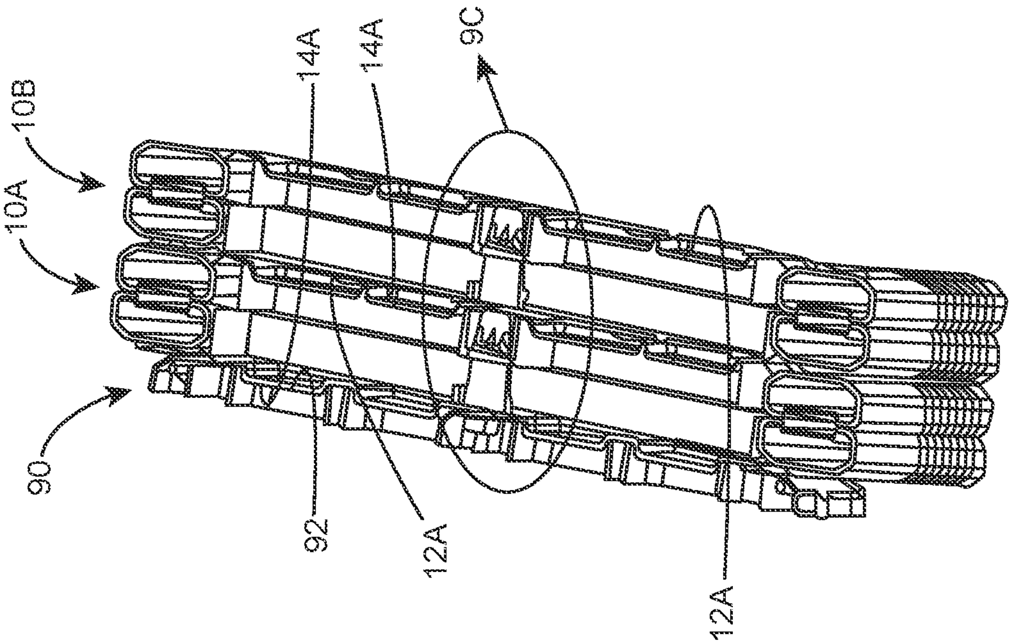
FIG. 9B is a horizontal section along line IX-IX in FIG. 9A.
Figure 9A:
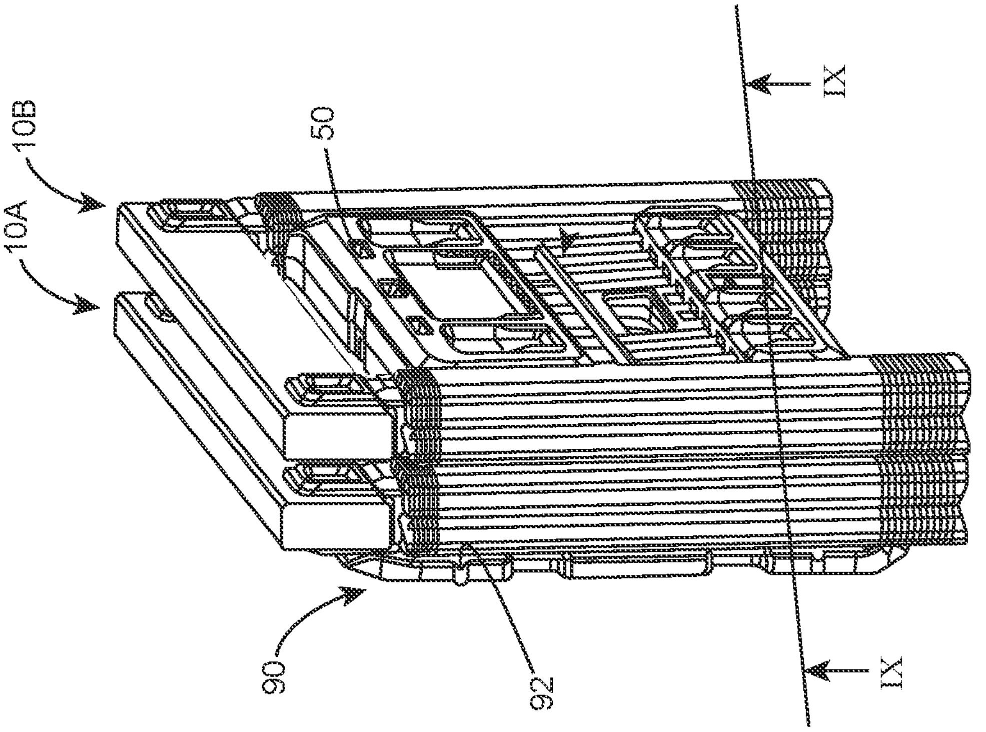
FIG. 9A is a perspective view of two sawhorses according to the disclosure articulated to one another and to a carrier platform, according to an example of the disclosure.
Figure 9C:
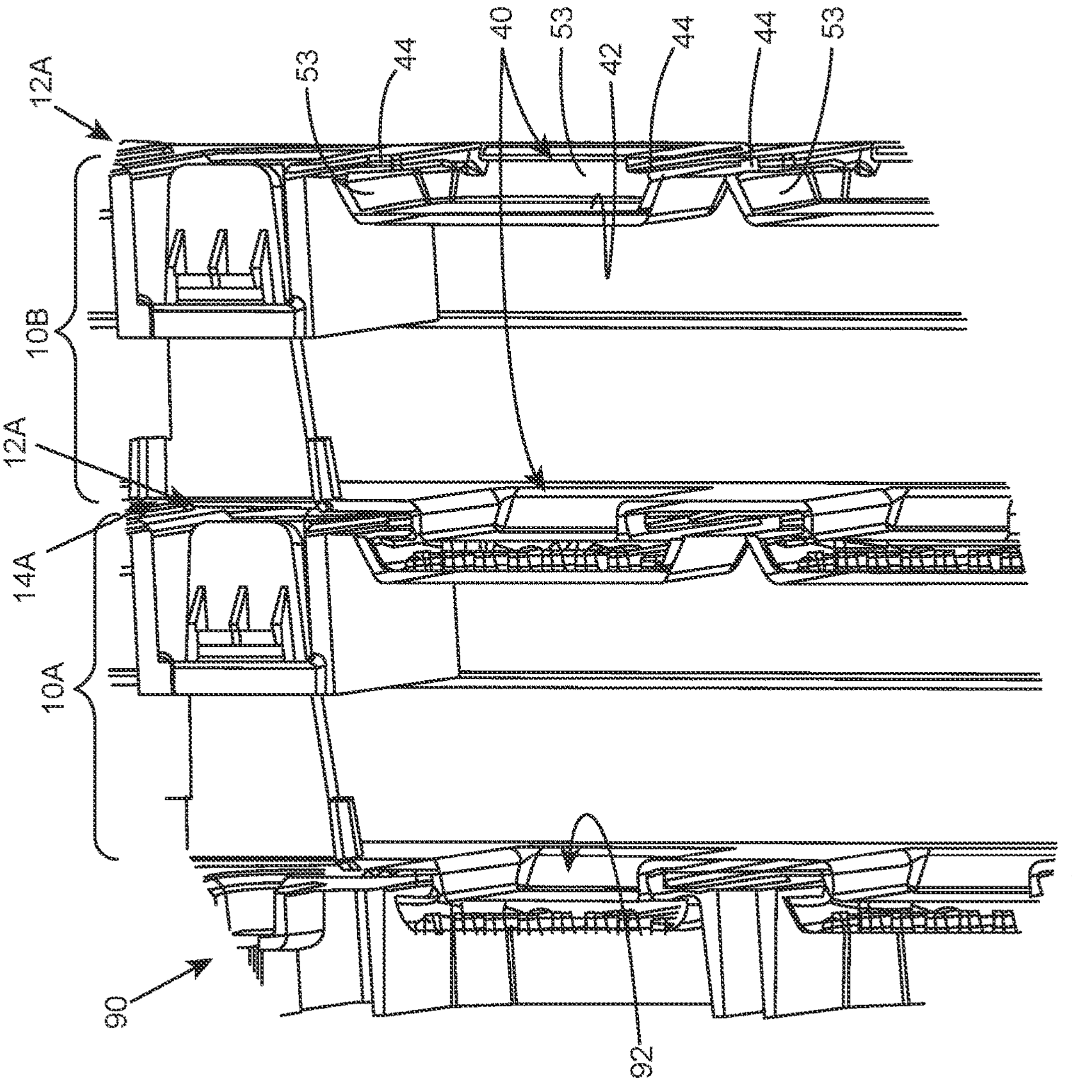
FIG. 9C is an enlargement of the portion marked 9C in FIG. 9B.

Reverting now to the male-type articulation locations 60 configured at the outside face 14A of the second support frame 14, and disposed also at a bottom face of a utility unit, for example the container 70 of FIG. 7. The male-type articulation locations, namely couplers 60, seen at larger scale in FIGS. 8A and 8B, extend in register with the female couplers 40 of the sawhorse 10 (and of a mounting plate 90 seen in FIG. 12A), as far as shape, size and positioning, whereby a utility unit can be articulated to the sawhorse at several locations thereof. Each male coupler 60 comprises a projecting locking location 68 disposed in register with said depressed female-type locking location 40, and is configured with a pair of laterally extending locking tongues 72 one at each side of the projecting locking location 68, i.e. facing away from one another, laterally extending along said engaging sliding path 48 (at a second, sense, opposite to said first sense), and configured for arresting engagement at the space 53 between said locking rib 44 and depressed surface 42.

Figure 4B:
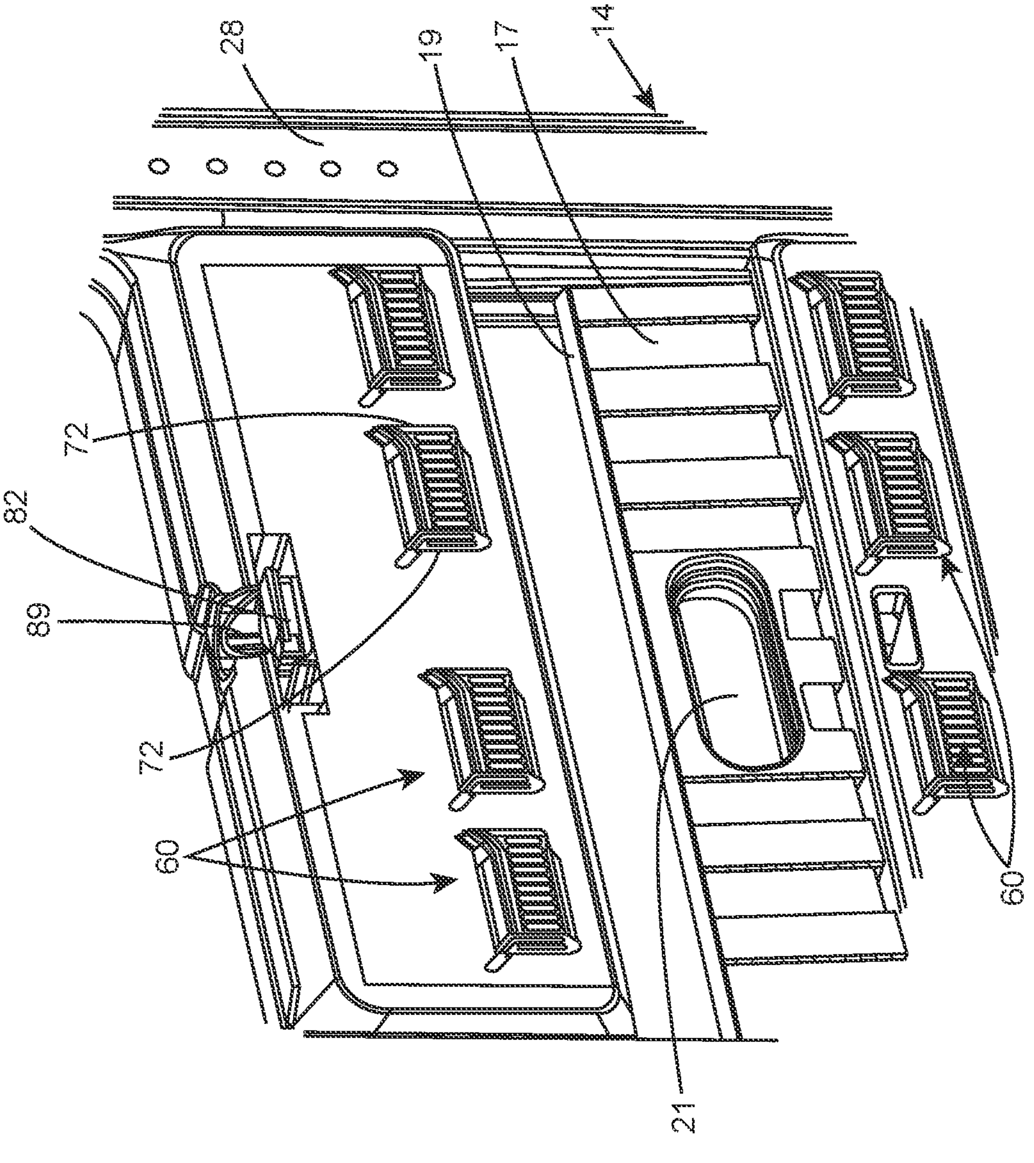
FIG. 4B is an enlargement of the portion marked 4B in FIG. 3B.

Further noted, the utility unit articulation face of the sawhorse, namely face 12A thereof (as well as mounting plate 90 of FIG. 12A) is configured with at least one locking latch arresting location, i.e. recesses 50, and the male face of the sawhorse, namely face 14A, as well as a bottom face 71 of utility unit (container 70) is configured with a locking latch 82 (FIGS. 6A and 6B), spring biased by spring 86 to project from the face 14A of the sawhorse 10 and from the bottom face 71 of the container 70, and being manually displaceable by a manipulating grip 87 through an aperture or recess 89 (seen also in FIG. 4B), between the normally projecting position and a manually retracted position (FIG. 6A), said locking member 82 disposed in register with at least one of the locking latch arresting locations 80.

Figure 5B:
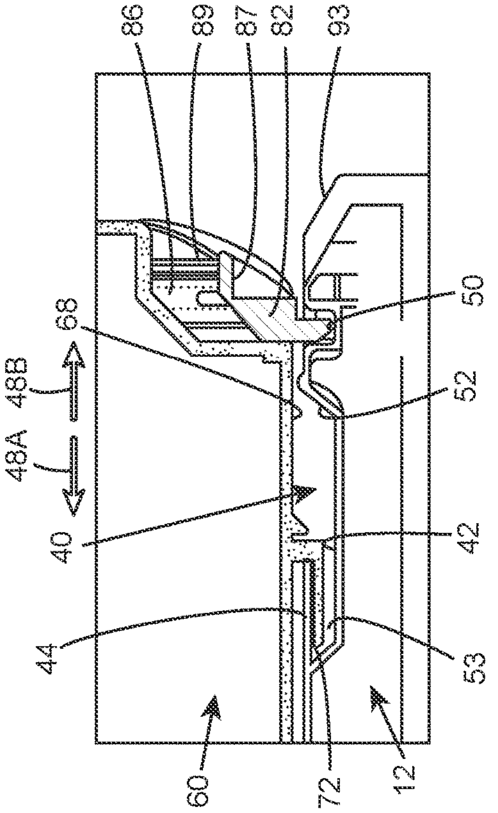

When it is required to detachably attach a utility unit to the sawhorse 10, the former is placed over the later, placing the projecting locking portions 68 within the depressed locking location 42 with the locking tongues 72 slidingly engaging below and being gradually arrested by the respective locking ribs 44 until complete arresting is obtained (FIG. 5B). At the fully engaged locked position (FIG. 5B) each locking rib 44 is disposed between the respective locking tongue 72 and the bottom face 62 of the utility unit (container 70), however bearing flush against at least a portion of the top surface of the locking tongues 72. Simultaneously, as the locking tongues 72 arrest by the locking ribs 44, the locking latch 82 of the utility unit (container 70) slides into the locking latch arresting location (recess 50) and finally snaps into locking engagement therewith.

It is noted the locking latch 82 is configured with a chamfered nose 91 whereby upon sliding displacement of the utility unit along the sliding path 48A it first glides over a guiding ramp surface 93 of the sawhorse, displacing it upwards against the biasing effect of spring 89 (in direction of arrow 95 in FIG. 6A), whereby when the utility unit 70 reaches the final locking position over the respective articulation face of the sawhorse, the locking latch 82 plunges into arresting position within the recess 50.

At the locked position, utility unit 70 is attached over the articulation face of the respective support frame 12A of the sawhorse. Detaching of a utility unit 70 from a sawhorse 10 is easily facilitated by unlocking, obtained by displacing the locking latch 82 upwards against the biasing effect of spring 86, whereby the utility unit 60 can be slidingly displaced along path 48B, and detached.

It is appreciated that the container 70 is a mere example of a utility unit, which can be any article of utility, either stationary of mobile, having a utility and being detachable attachable to other utility units. A utility unit according to the present disclosure can be, by way of example, any type of container, work surface, locomotion system, mounting system, hand tool, support element, and the like.

The male/female articulation arrangement disclosed herein is an example, and is understood that other coupling arrangements can be utilized, such as, for example, a bayonet coupling arrangement, however bearing in mind that the coupling arrangement should offer a fast and reliable attaching/detaching arrangement between the utility unit and the sawhorse, and for attaching the sawhorse to a carrying member. #

Figure 12C:
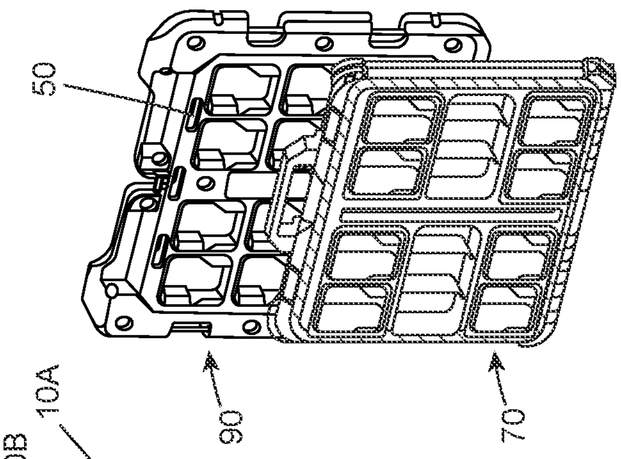
FIG. 12C illustrates a container mounted on a mounting platform according to FIG. 12A.
Figure 12B:
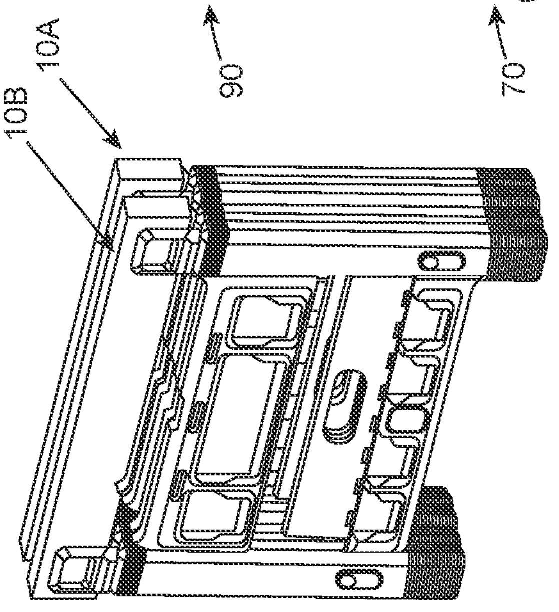
FIG. 12B illustrates two sawhorses mounted on a mounting platform according to FIG. 12A.
Figure 12A:
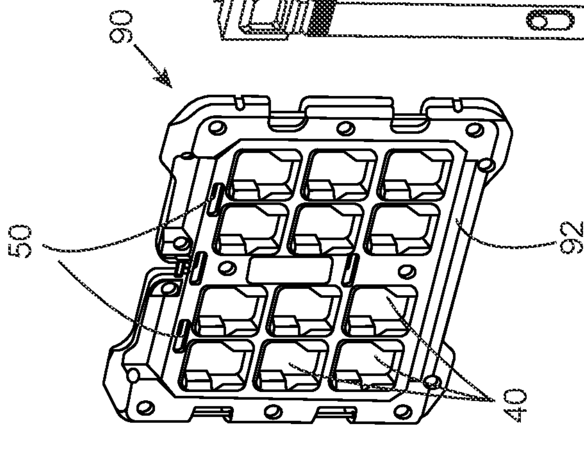
FIG. 12A is a perspective view of a mounting platform used in conjunction with a sawhorse according to the disclosure.

Turning now to FIGS. 9A to 9C and 12B there is illustrated an arrangement wherein a first sawhorse according to the present disclosure, generally designated 10A, is detachably articulated to a mounting plate 90 similar to that disclosed in FIG. 12A, and wherein a second sawhorse according to the present disclosure, generally designated 10B, is detachably articulated to first sawhorse 10A. The arrangement is such that the face 92 of the mounting plate 90 is configured with a plurality of female-type articulation locations 40 (similar to female-type coupling locations 40 configured on the first face 12A of the sawhorse 10 as disclosed hereinbefore), whereby the first sawhorse 10A is slidingly articulated over the mounting plate 90 by male type couplers disposed over the first face 14A of the first sawhorse 10A slidingly articulated with said female articulation locations 40 of the mounting plate 90. In turn the second sawhorse 10B is detachably mounted over the first sawhorse 10A through the male-type articulation locations 60 at the first face 14A of the second sawhorse 10B being slidingly articulated with the female-type articulation locations 40 at the first face 12A of the first saw horse 10A.

It is appreciated that in FIGS. 12A to 12C that the mounting plate 90 serves as a carrying member to which a sawhorse 10 can be detachably articulated, wherein the mounting plate 90 can be integral with or integrated with a carrying wall surface, etc. Also, the mounting plate 90 can be used for directly attaching thereto various utility units (FIG. 12C), such as container 70 (as disclosed in connection with FIG. 7).

Figure 10B:
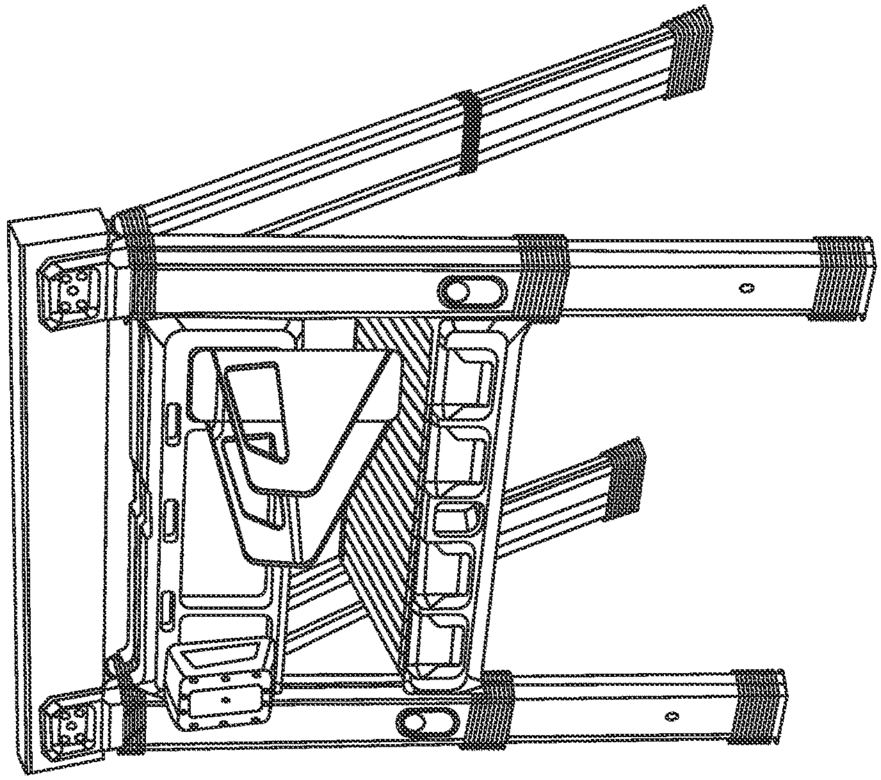
FIGS. 10A and 10B illustrate examples of articulating utility units to the sawhorse.
Figure 10A:
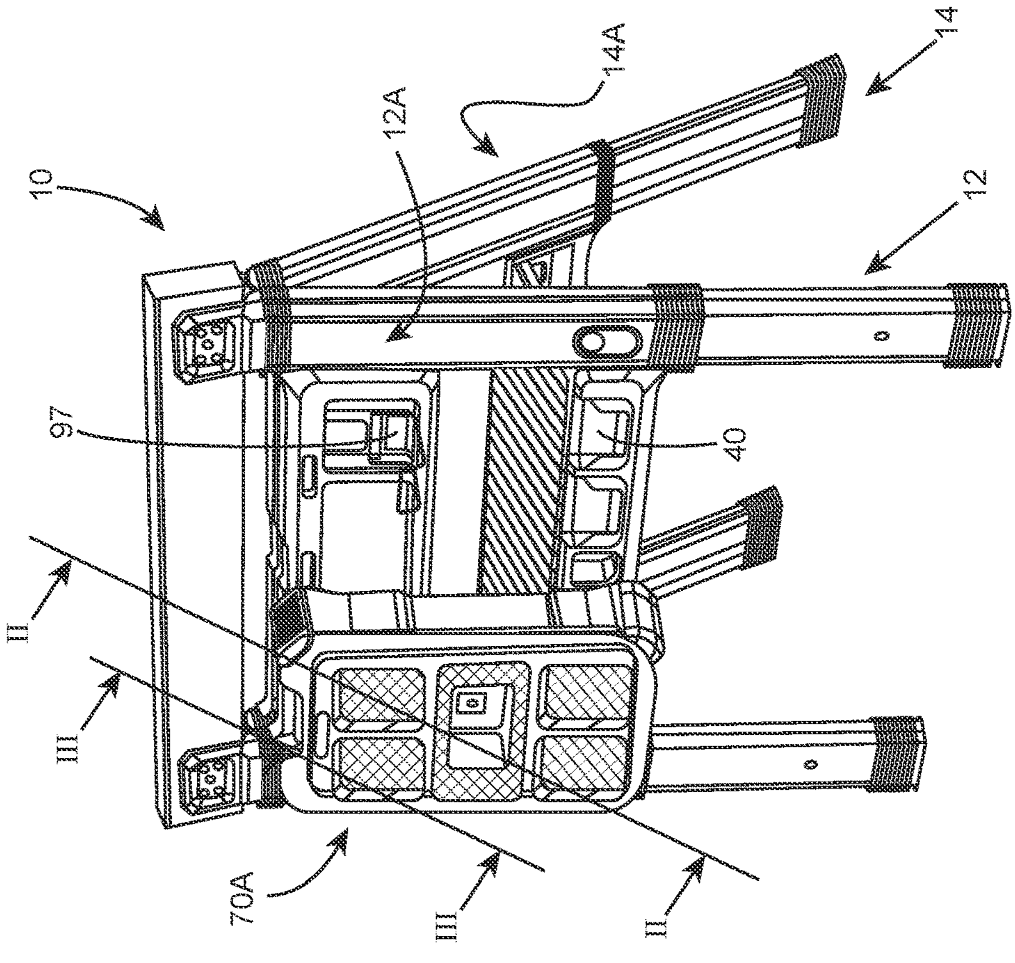

FIG. 10A illustrates a sawhorse 10 according to the present disclosure, and as disclosed hereinabove, at its deployed, open position, wherein an organizer container 70A is detachably articulated over the first face 12A of the first support frame of the sawhorse 10. Also attached to the first face 12A there is a holder 97 useful, for example, for supporting a hand tool such as a drill, hammer, jigsaw, etc. It is appreciated that both the organizer container 70A and the holder 97 are each configured with one or more male type-couplers adapted for engagement with corresponding female-type articulation locations 40 at the first face 12A of the sawhorse 10.

Figure 11B:
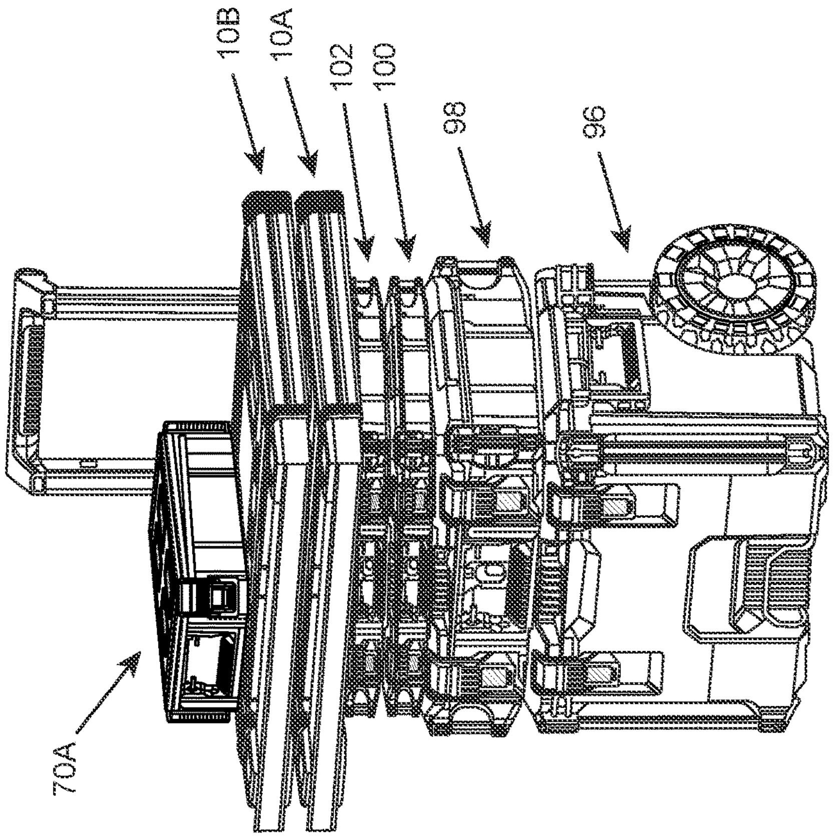
FIGS. 11A and 11B are examples of articulating the sawhorse to a wheeled container assembly.
Figure 11A:
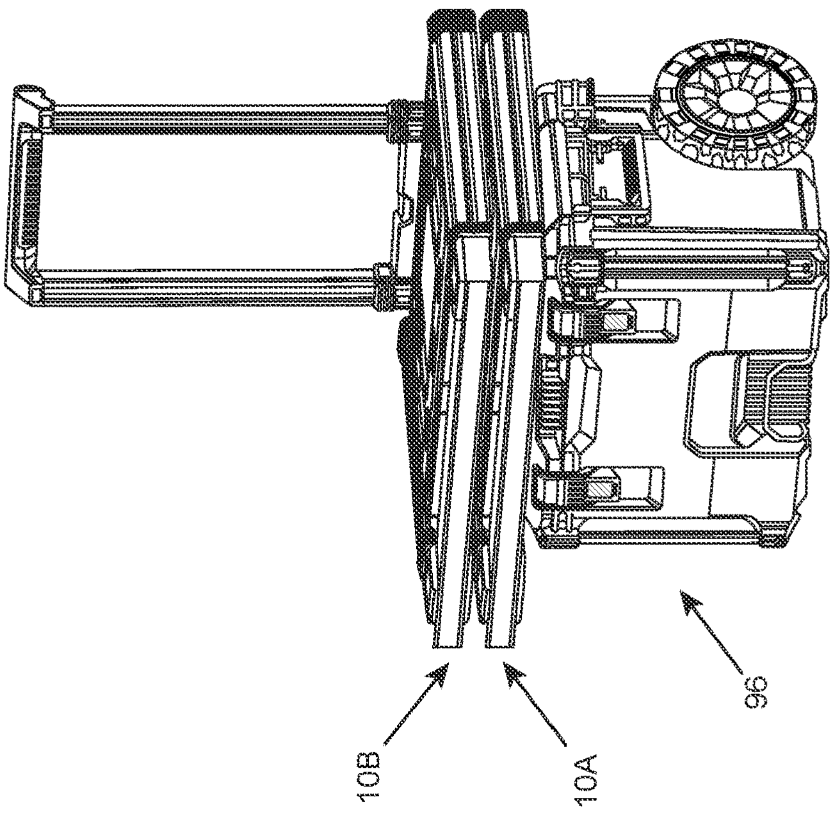

In FIG. 11A there is illustrated a pair of sawhorses 10A and 10B, according to the disclosure hereinbefore, detachably secured to one another (similar to the arrangement disclosed in connection with FIG. 9) and in turn being detachably articulated over a top cover of a wheeled container 96, wherein articulation is facilitated through the first face 14A of the second support frame 14 of the sawhorse 10, i.e. the male-type articulation locations 60 thereof being slidingly engaged with female-type articulation locations disposed over the cover of the container 96, said female-type articulation locations being similar to articulation locations 40 of the sawhorse 10.

Figure 6A:
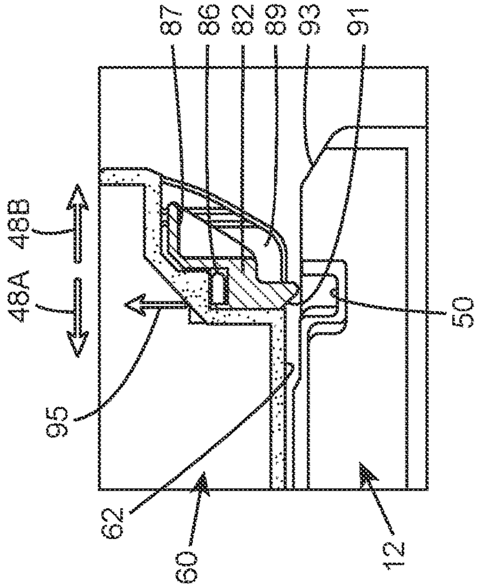
FIGS. 6A and 6B are locally sectioned views along line III-III in FIG. 10A, illustrating consecutive steps of locking a utility unit container to the sawhorse, according to the disclosure.
Figure 6B:
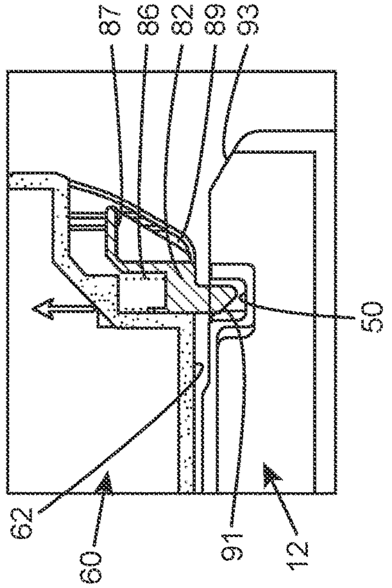

In FIG. 11B, the pair of sawhorses 10A and 10B is mounted over an organizer container 102 which in turn is articulated over another organizer container 100, and which in turn is articulated over a container 98 and in turn over the wheeled container 96, however with a smaller container 70A articulated over the female-type couplers 40 at the first face 12A of the top sawhorse 10B. it is appreciated that coupling between all containers and sawhorses is facilitated through a male-female type articulation locations as disclosed hereinabove, with a locking arrangement provided (as in connection with FIGS. 6A and 6B).

Figure 13C:
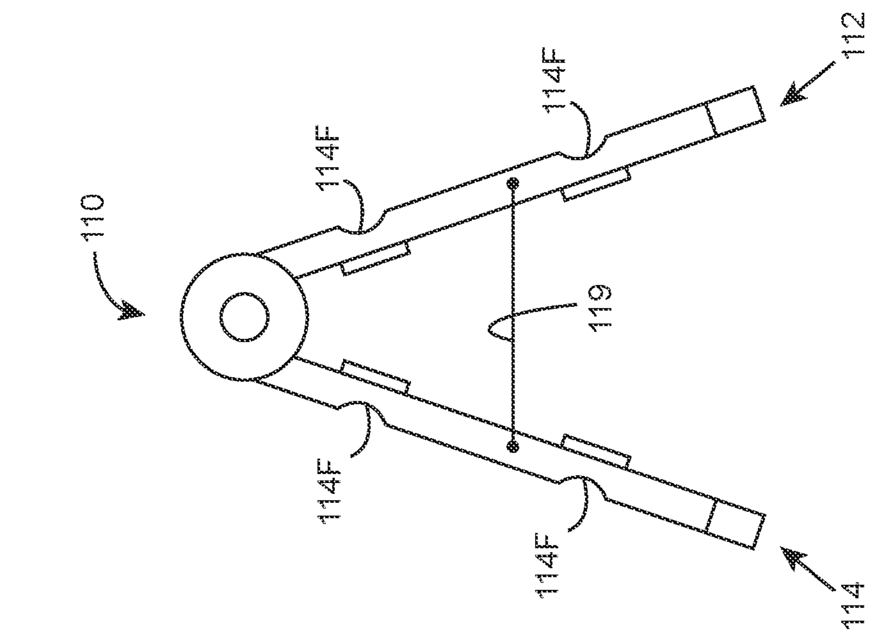
FIGS. 13A to 13C are schematic side views of a sawhorse according to a configuration of the disclosure, at a collapsed position, an inverted collapsed position and a deployed position, respectively.
Figure 13B:
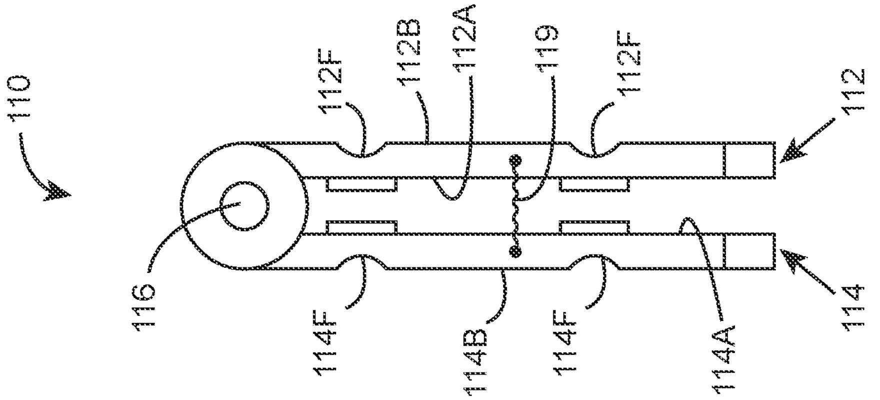
Figure 13A:
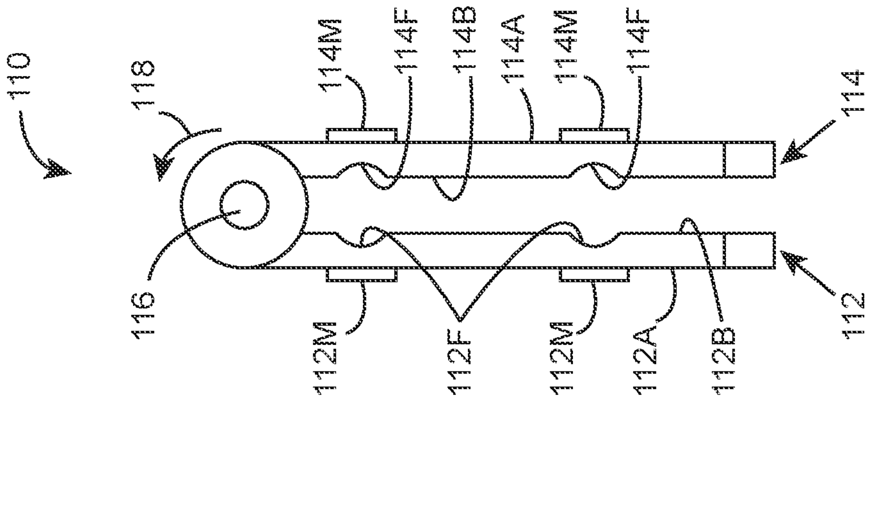

In FIGS. 13A to 14B there are schematic illustration of two variations of a sawhorse according to the present disclosure, both following the same principals. The sawhorse 110 of FIGS. 13A to 13C comprises a first support frame 112 and a second support frame 114 pivotally articulated to one another at their top end, about axis 116. The first support frame 112 has a first face 112A configured with an array of male-type coupling locations 112M and a second face 112B configured with an array of female-type coupling locations 112F. Likewise, the second support frame 114 has a first face 114A configured with an array of male-type coupling locations 114M and a second face 114B configured with an array of female-type coupling locations 114F. In the position of FIG. 13A all male-type couplers 112M and 114M are disposed on the outside faces of the sawhorse 110. However, upon pivotally swinging the second support frame 114 about the axis 116 through 360° in direction of arrow 118 in FIG. 13A, the new position is such that all outside faces of the sawhorse are now positioned with female-type couplers 112F and 114F, respectively such that at a deployed, working position (FIG. 13C) there is more surface area configured with female-type couplers, for articulating more utility units (not shown). It is noted that angular restricting member 119 is configured for securing the angular opening between the support frames.

Figure 14A:
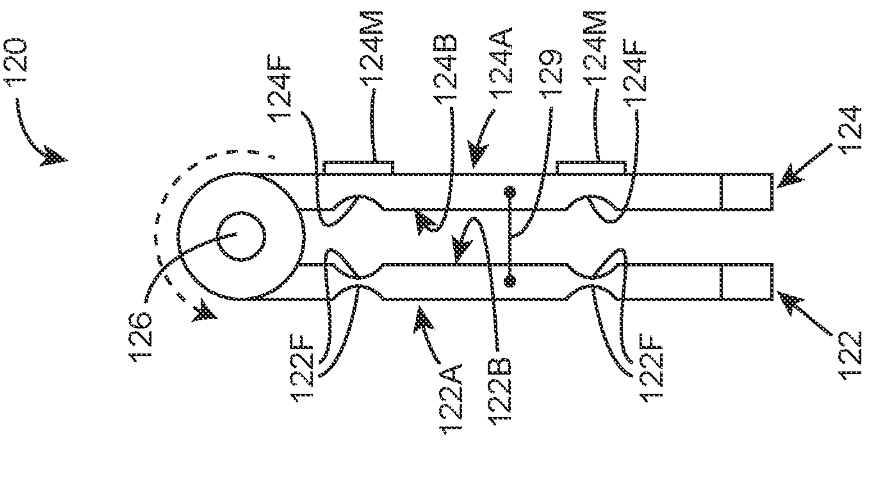
FIGS. 14A and 14B are yet an example of a sawhorse according to a configuration of the disclosure, at a collapsed position and an inverted collapsed position.
Figure 14B:
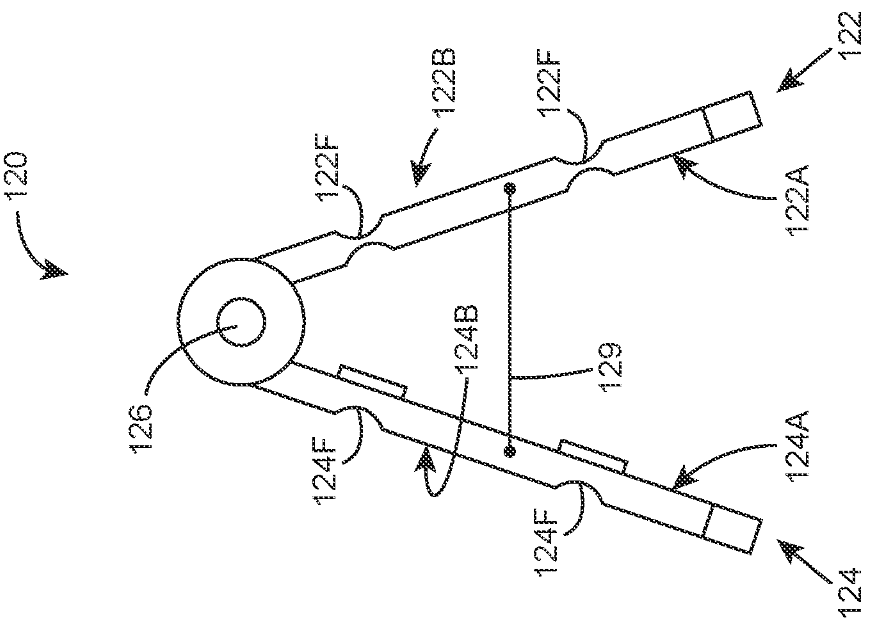

The sawhorse 120 of FIGS. 14A and 14B comprises a first support frame 122 and a second support frame 124 pivotally articulated to one another at their top end, about axis 126. The first support frame 122 has a first face 122A and a second face 122B, both configured with an array of female-type coupling locations 122F. The second support frame 124 has a first face 124A configured with an array of male-type coupling locations 124M and a second face 124B configured with an array of female-type coupling locations 124F. In the position of FIG. 14A the sawhorse can be disposed for articulating the face 124A over a mounting plate (not shown) whilst the face 122A can serve for articulating thereto different utility units (not shown). Notably, the sawhorse 120 can be deployed at this situation as well. However, in the position of FIG. 14B, the sawhorse second support frame 124 is swung by 360° over axis 126, whereby only female-type couplers 122F and 124F are disposed at the outside faces 122B and 124A, respectively, providing for increased mounting area over the sawhorse 120.

Figure 15B:
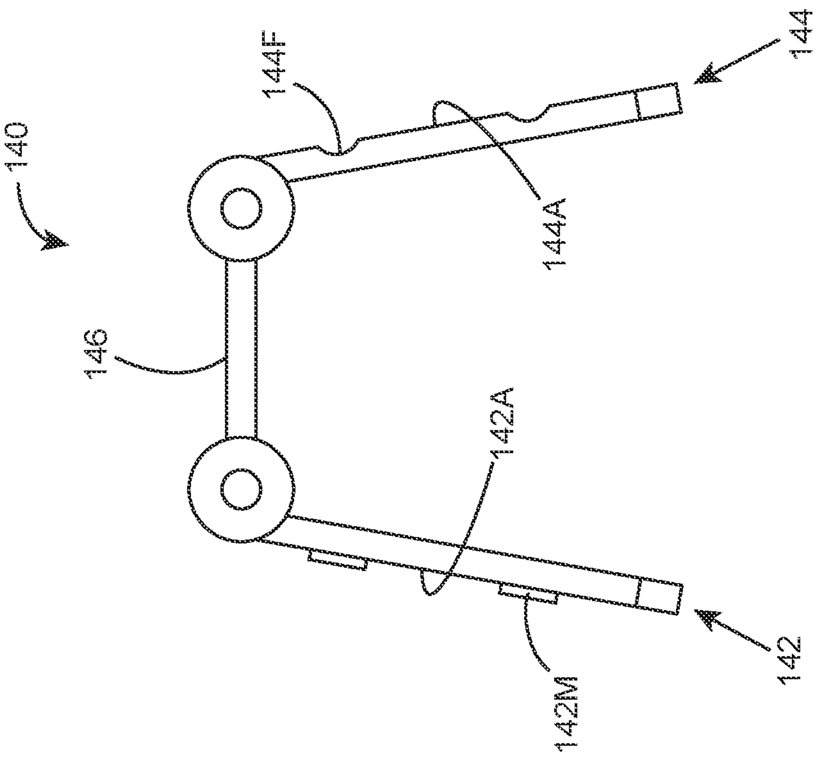
FIGS. 15A to 15D are different examples of sawhorses according to other configurations of the disclosure.
Figure 15A:
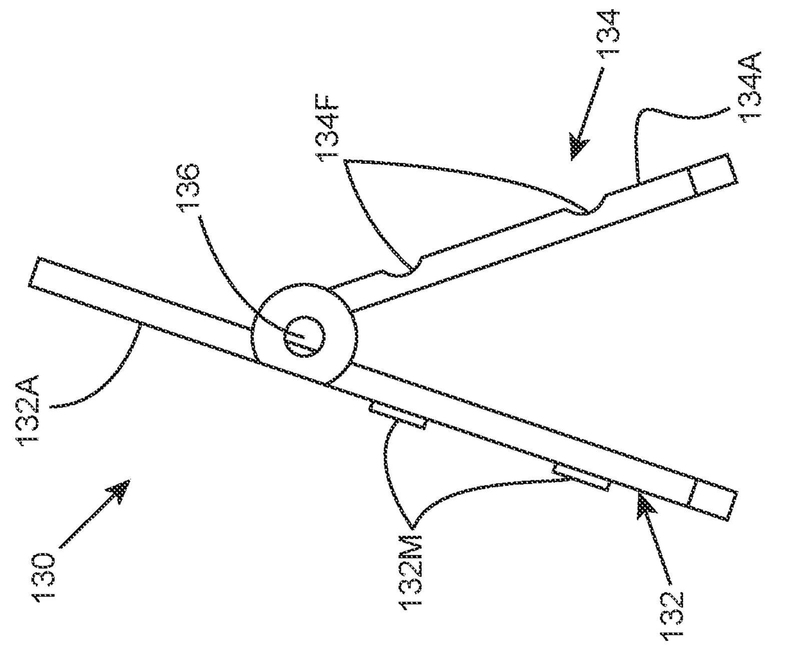

FIGS. 15A to 15D schematically illustrate examples of different sawhorse configurations according to the present disclosure. In FIG. 15A the sawhorse 130 has a first support frame 132 and a second support frame 134 pivotally articulated to the first support frame 132 at a pivot axis 136 disposed intermediately along the first support frame. The first support frame 132 is configured at a first face thereof 132A with a plurality of male-type couplers 132M, and the second support frame 134 is configured at a first face thereof 134A with a plurality of female-type couplers 134F.

Figure 15D:
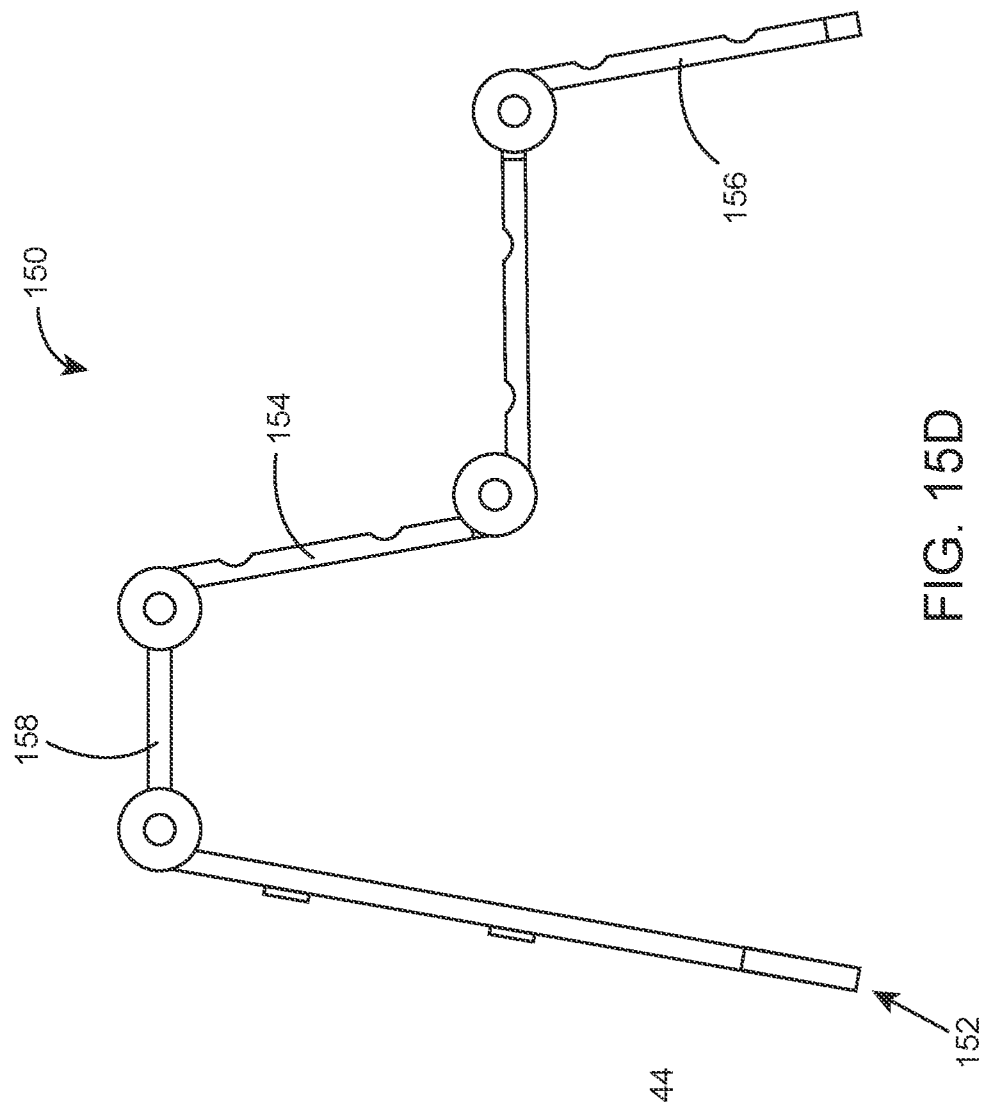
Figure 15C:
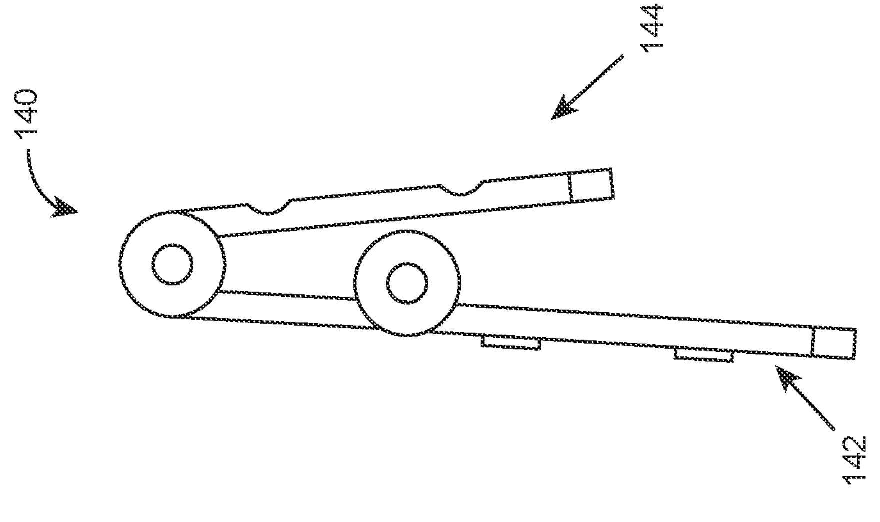

The sawhorse 140 of FIGS. 15B and 15C comprises a first support frame 142 and a second support frame 144, pivotally articulated at their respective top end to an interconnecting support link 146, wherein the first support frame 142 is configured at a first face thereof 142A with a plurality of male-type couplers 142M, and the second support frame 144 is configured at a first face thereof 144A with a plurality of female-type couplers 144F. the sawhorse is configurable between a deployed, table-like configuration (FIG. 15B) and a collapsed, stowing position (FIG. 15C).

The sawhorse 150 of FIG. 15D resembles that disclosed in FIGS. 15B and 15C, comprises a first support frame 152 and an interconnection top link frame 158, however the second support frame is composed of two pivotally articulated segments 154 and 156, imparting the sawhorse additional modularity, and wherein at least one face of any of the support frames is configured with coupling locations (male and/or female couplings as discussed above).

The invention claimed is:

1. A sawhorse comprising a first support frame and a second support frame, each having a first surface and a second surface, respectively, said second support frame articulated to the first support frame, whereby the sawhorse is manipulable between at least one collapsed position and at least one deployed position; and wherein at least one of the first surface and the second surface of at least one of the first support frame and the second support frame is configured with an array of articulation locations for detachably attaching one or more utility units to the sawhorse and for detachably attaching the sawhorse to a carrying member, wherein a face of at least one of the first support frame and the second support frame defines an articulation face, and the articulation locations comprise at least one female coupler, said female coupler having a depressed locking location configured with at least one locking rib extending above a depressed plane and along a sliding path, and having a slanted open edge facing in a first direction along the sliding path; the female coupler being configured for detachably attaching thereto a male coupler defined on a face of the utility unit, said male coupler having a projecting locking location disposable in register with said depressed locking location and configured with at least one locking tongue extending along an engaging sliding path at a second direction, opposite to said first direction, and configured for arresting engagement with the female coupler at a space between said locking rib and depressed plane of said female coupler.

2. The sawhorse of claim 1, wherein the sawhorse is configured with a plurality of said female couplers.

3. The sawhorse of claim 1, wherein sliding engagement and disengagement of a utility unit take place along a sliding path extending substantially parallel to the depressed plane of the female couplers.

4. The sawhorse claim 1, further comprising a locking mechanism associated with the articulation locations configured to prevent spontaneous detaching of a utility unit from the sawhorse.

5. The sawhorse of claim 4, wherein the locking mechanism comprises a locking latch arresting location located at the articulation face and configured for engagement with a locking member displaceable and disposable in register with said locking latch arresting location of the utility unit, wherein at a locked position the locking latch arresting location is configured to arrest the locking member, and further wherein disengaging the utility unit from the sawhorse is facilitated by disengaging the locking latch from the locking latch arresting location.

6. The sawhorse of claim 5, wherein the locking mechanism is spring biased.

7. The sawhorse of claim 5, wherein the locking latch is associated with and extends from a male coupler.

8. The sawhorse of claim 1, wherein the first frame and the second frame are articulated to one another at their respective top portions and wherein at the deployed position the sawhorse has an upside-down V-like shape.

9. The sawhorse of claim 1, wherein one or both of the first support frame and the second support frame comprise a height adjusting leg member.

10. The sawhorse of claim 1, wherein the first support frame and the second support frame are articulated to one another through one or more interconnecting frame members.

11. The sawhorse of claim 1, wherein both faces of each of the first support frame and the second support frame is configured with said articulation locations.

12. The sawhorse of claim 1, wherein the first support frame and the second support frame are swingable between a collapsed position and at least one deployed position.

13. The sawhorse of claim 1, wherein the articulation locations are integral with the first support frame and the second support frame, or integrated therewith.

14. The sawhorse of claim 1, wherein the at least one locking rib of the articulation locations extends substantially parallel to the sliding path.

15. The sawhorse of claim 1, wherein the at least one locking rib extends substantially perpendicular and intersect an interlocking sliding path.

16. The sawhorse of claim 1, wherein the female coupler comprises a single locking rib extending at rear end of the depressed locking location and substantially perpendicular to the sliding path.

17. The sawhorse of claim 1, wherein the female coupler comprises two locking ribs extending at side edges of the depressed locking location and disposed substantially parallel to the sliding path.

18. The sawhorse of claim 1, wherein the female coupler comprises two locking ribs each extending at a respective side edge of two neighboring depressed locking locations, said locking ribs disposed substantially parallel to the sliding path.

19. The sawhorse of claim 1, wherein the articulation location is configured such that engaging the utility unit with the articulation face of the sawhorse is facilitated by sliding the utility unit with respect to the utility unit articulation face along a sliding path defined by at least one of said at least one locking rib and said at least one locking tongue.

20. The sawhorse of claim 4, wherein the locking mechanism comprises a locking member, configured for displacing into a locking latch arresting location located at a face of the utility unit, wherein at a locked position the locking member is configured to be arrested within the locking latch arresting location.

21. A sawhorse assembly comprising a sawhorse and one or more utility units, the sawhorse comprising a first support frame and a second support frame, each having a first surface and a second surface, respectively, said second support frame articulated to the first support frame, whereby the sawhorse is manipulable between at least one collapsed position and at least one deployed position; and wherein at least one of the first surface and the second surface of at least one of the first support frame and the second support frame is configured with an array of articulation locations for detachably attaching said one or more utility units to the sawhorse and for detachably attaching the sawhorse to a carrying member, and wherein a face of at least one of the first support frame and the second support frame defines an articulation face, and the articulation locations comprise at least one male coupler at one of the articulation face and a face of the utility unit, and a female coupler at the other one of the articulation face and the face of the utility unit, said female coupler having a depressed locking location configured with at least one locking rib extending above a depressed plane and along a sliding path, and having a slanted open edge facing in a first direction along the sliding path; said male coupler having a projecting locking location disposed in register with said depressed locking location and configured with at least one locking tongue extending along an engaging sliding path at a second direction, opposite to said first direction, and configured for arresting engagement with the female coupler at a space between said locking rib and depressed plane of said female coupler.

* * * * *